(12) United States Patent
Lee

(10) Patent No.: US 12,176,624 B2
(45) Date of Patent: Dec. 24, 2024

(54) MILLIMETER WAVE COMMUNICATION DEVICE MOUNTED IN VEHICLE AND MILLIMETER WAVE COMMUNICATION DEVICE SWITCHING METHOD

(71) Applicant: Samsung Electronics Co., Ltd., Suwon-si (KR)

(72) Inventor: Jaewoong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 18/067,426

(22) Filed: Dec. 16, 2022

(65) Prior Publication Data

US 2023/0140472 A1  May 4, 2023

Related U.S. Application Data

(63) Continuation of application No. PCT/KR2021/008024, filed on Jun. 25, 2021.

(30) Foreign Application Priority Data

Jun. 26, 2020 (KR) .................. 10-2020-0078807

(51) Int. Cl.
*H01Q 3/24* (2006.01)
*H01Q 1/02* (2006.01)
(Continued)

(52) U.S. Cl.
CPC .................. *H01Q 3/24* (2013.01); *H01Q 1/02* (2013.01); *H01Q 1/32* (2013.01); *H04B 7/043* (2013.01);
(Continued)

(58) Field of Classification Search
CPC .......... H01Q 1/02; H01Q 1/32; H01Q 1/3275; H01Q 3/24; H01Q 3/26
See application file for complete search history.

(56) References Cited

U.S. PATENT DOCUMENTS

| 6,236,372 B1 | 5/2001 | Lindenmeier et al. |
| 7,664,535 B2 | 2/2010 | Onishi |

(Continued)

FOREIGN PATENT DOCUMENTS

| JP | 4828144 B2 | 11/2011 |
| JP | 2012-244268 A | 12/2012 |

(Continued)

OTHER PUBLICATIONS

International Search Report dated Sep. 30, 2021, issued in International Patent Application No. PCT/KR2021/008024.

(Continued)

*Primary Examiner* — Hoang V Nguyen
(74) *Attorney, Agent, or Firm* — Jefferson IP Law, LLP

(57) ABSTRACT

A millimeter wave communication device mounted on a vehicle and including a plurality of antenna modules and an operating method of the millimeter wave communication device are provided. The millimeter wave communication device includes recognizing an operation state change due to overheating of each of a plurality of antenna modules, switching antennas by selecting any one of a plurality of antenna modules on standby according to the recognized operation state change, and performing beamforming by the antenna module, to which switching has been performed, by using prestored beamforming simulation data, thereby maintaining continuity of data communication with a base station.

16 Claims, 15 Drawing Sheets

(51) Int. Cl.
  *H01Q 1/32* (2006.01)
  *H04B 7/0426* (2017.01)
  *H04B 7/0456* (2017.01)
  *H04B 17/391* (2015.01)

(52) U.S. Cl.
  CPC ....... *H04B 7/0456* (2013.01); *H04B 17/3912* (2015.01)

(56) References Cited

U.S. PATENT DOCUMENTS

| | | | |
|---|---|---|---|
| 9,812,778 | B2 | 11/2017 | Camilleri et al. |
| 10,593,183 | B2 | 3/2020 | Funaki et al. |
| 11,394,435 | B2 | 7/2022 | Lee et al. |
| 11,489,571 | B2 | 11/2022 | Maki |
| 2014/0199952 | A1 | 7/2014 | Sandhu et al. |
| 2015/0349836 | A1 | 12/2015 | Ponukumati et al. |
| 2018/0323834 | A1 | 11/2018 | Jiang et al. |
| 2019/0140722 | A1 | 5/2019 | Raghavan et al. |
| 2019/0319663 | A1 | 10/2019 | Shimura |
| 2019/0349058 | A1 | 11/2019 | Raghavan et al. |
| 2020/0185818 | A1* | 6/2020 | Kim ............... H01Q 1/02 |
| 2021/0025970 | A1 | 1/2021 | Sahara et al. |

FOREIGN PATENT DOCUMENTS

| | | |
|---|---|---|
| JP | 2019-190882 A | 10/2019 |
| JP | 2021-090146 A | 6/2021 |
| KR | 100075074 B1 | 12/1993 |
| KR | 10-2011-0100015 A | 9/2011 |
| KR | 10-2015-0106911 A | 9/2015 |
| KR | 10-2020-0120463 A | 10/2020 |
| WO | 2020/005294 A1 | 1/2020 |

OTHER PUBLICATIONS

Korean Office Action dated Mar. 8, 2024, issued in Korean Application No. 10-2020-0078807.
Extended European Search Report dated Nov. 2, 2023, issued in European Patent Application No. 21830222.2.

* cited by examiner

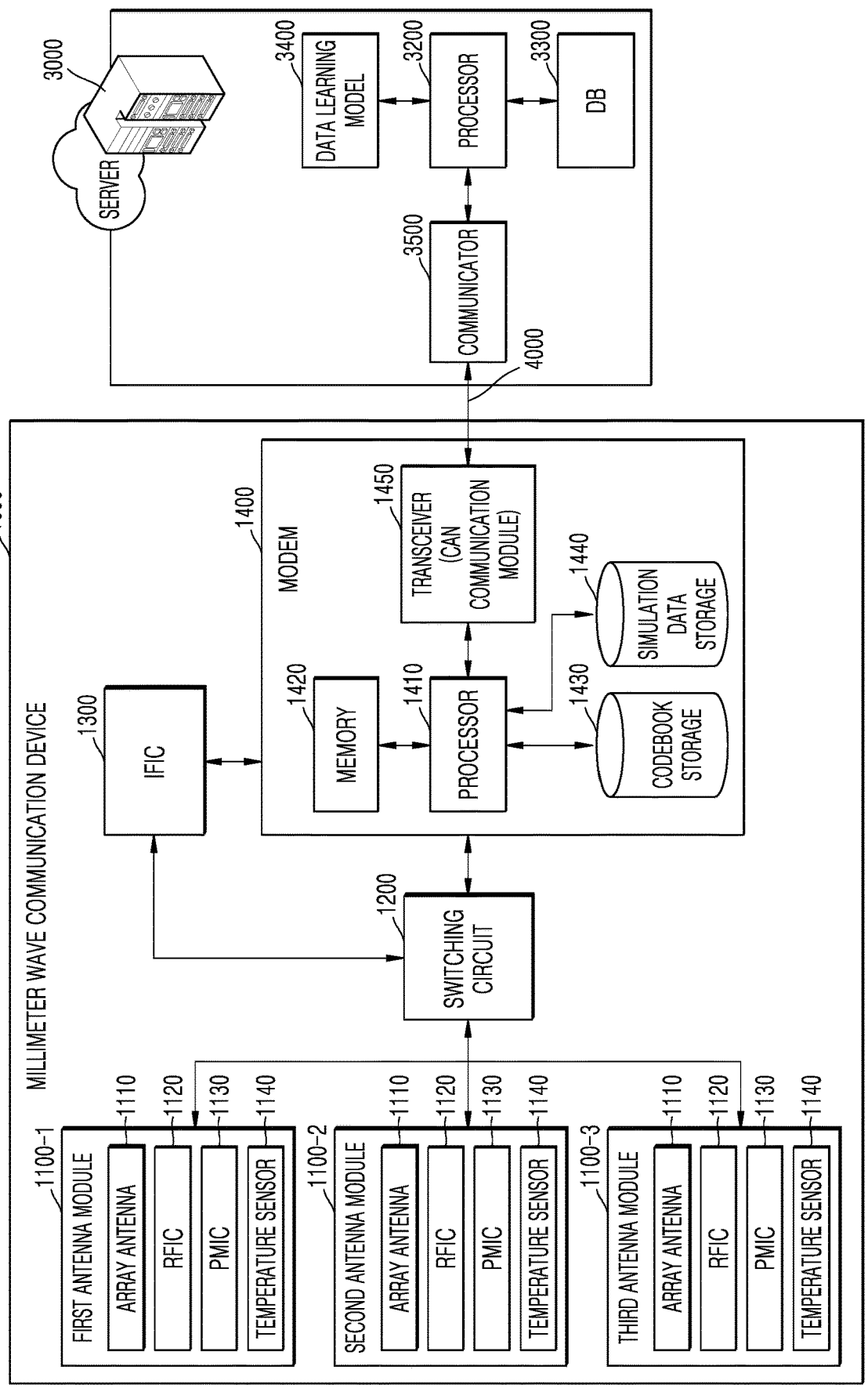

MILLIMETER WAVE COMMUNICATION DEVICE MOUNTED IN VEHICLE AND MILLIMETER WAVE COMMUNICATION DEVICE SWITCHING METHOD

CROSS-REFERENCE TO RELATED APPLICATION(S)

This application is a continuation application, claiming priority under § 365(c), of an International application No. PCT/KR2021/008024, filed on Jun. 25, 2021, which is based on and claims the benefit of a Korean patent application number 10-2020-0078807, filed on Jun. 26, 2020, in the Korean Intellectual Property Office, the disclosure of which is incorporated by reference herein in its entirety.

BACKGROUND

1. Field

The disclosure relates to a millimeter wave communication device mounted on a vehicle. More particularly, the disclosure relates to a method used by the millimeter wave communication device to perform antenna switching according to an operation state change.

2. Description of Related Art

Recently, vehicle-to-everything (V2X) communication has been used to transmit/receive data through a wired/wireless communication network around a vehicle. V2X communication requires low latency and high data transmission rates for data transmission/reception for autonomous vehicle driving, high-resolution map data, over-the-air (OTA) vehicle operating system update, or the like. Particularly, for autonomous vehicle driving, in order to improve the recognition rates for surrounding environments such as surrounding vehicles or roads on which vehicles are driving, because data should be transmitted/received in real time to/from cameras, light detection and ranging (LIDAR) sensors, other radars, or servers, high data rates and low latency are required.

In order to implement a high data rate and low latency, a millimeter wave (mmWave) antenna module is used in V2X communication. The millimeter wave antenna module includes an array antenna in which a plurality of antenna elements are arranged, and a power amplifier (PA) for increasing the power of an antenna transmission signal is connected to each array antenna. However, when a millimeter wave communication device transmits a signal, the power of the transmission signal is reduced due to the heat generated in a power amplifier included in an antenna module.

Because a millimeter wave communication device mounted on a vehicle requires a high transmission signal power level unlike a small device such as a smart phone, a lot of heat may be generated in a power amplifier included in an antenna module. Also, in the case of the vehicle, due to exposure to an external environment for a long time, the temperature of the antenna module may increase rapidly under the influence of an external temperature. In the case of a millimeter wave communication device mounted on a vehicle, because the power of a transmission signal is reduced due to overheating and thus the efficiency of data transmission/reception is reduced, a design or algorithm capable of overcoming this problem is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a millimeter wave communication device mounted on a vehicle and including a plurality of antenna modules and a method of recognizing an operation state change due to overheating of the millimeter wave communication device and switching antennas according to the recognized operation state change for continuity of communication connection and data transmission/reception with a base station.

Additional aspects will be set forth in part in the description which follows and, in part, will be apparent from the description, or may be learned by practice of the presented embodiments.

In accordance with an aspect of the disclosure, a millimeter wave communication device mounted on a vehicle is provided. The millimeter wave communication device includes a plurality of antenna modules configured to transmit/receive data on a millimeter wave communication channel formed with a base station, a switching circuit connected to each of the plurality of antenna modules and configured to perform antenna switching by selecting any one of the plurality of antenna modules, and a modem connected to the plurality of antenna modules and the switching circuit and configured to control operations of the plurality of antenna modules and the switching circuit, wherein the modem includes a memory storing a program including one or more instructions, a processor configured to execute the one or more instructions of the program stored in the memory, and a storage storing, for continuity of data communication with the base station, beamforming simulation data including information about beam directionality obtained through pre-performed simulation according to positions at which the plurality of antenna modules are arranged, wherein the processor is further configured to calculate, by using the beamforming simulation data stored in the storage, a phase value for performing beamforming with respect to the base station by each of the plurality of antenna modules, recognize an operation state change of a first antenna module among the plurality of antenna modules, control, according to the recognized operation state change, the switching circuit to perform antenna switching from the first antenna module to a second antenna module among the plurality of antenna modules, and control, by using the calculated phase value, the second antenna module to perform beamforming for forming a communication channel with the base station.

In an embodiment, the beamforming simulation data may include a phase correction value pre-obtained through simulation to correct a phase value for beamforming based on a position and angle at which each of the plurality of antenna modules is arranged and a direction of a beam directed to the base station when antenna switching is performed.

In an embodiment, the millimeter wave communication device may further include a codebook storage including a code word including a phase shift matrix having a phase value for performing beamforming with respect to the base station by each of the plurality of antenna modules as a variable, wherein the beamforming simulation data may be obtained by pre-calculation based on the code word included in the codebook storage.

In an embodiment, each of the plurality of antenna modules may include a temperature sensor configured to measure a module temperature, and the processor may be further configured to measure a module temperature of the first antenna module in operation according to a preset time period by using the temperature sensor.

In an embodiment, the processor may be further configured to detect a first time point at which the measured module temperature of the first antenna module exceeds a preset threshold temperature and control the switching circuit to switch from the first antenna module in operation to the second antenna module at the first time point.

In an embodiment, the processor may be further configured to detect a second time point at which the measured module temperature of the first antenna module reaches a preset threshold range lower than a preset threshold temperature and identify whether calculation of the phase value for performing beamforming with respect to the base station by each of the plurality of antenna modules is completed at the second time point.

In an embodiment, the processor may be further configured to determine an antenna module to which switching is to be performed, as the second antenna module based on a module temperature of each of the plurality of antenna modules and whether calculation of the phase value is completed.

In accordance with another aspect of the disclosure, a method, performed by a millimeter wave communication device mounted on a vehicle, of performing antenna switching is provided. The method includes transmitting/receiving data on a millimeter wave communication channel formed with a base station through a first antenna module among a plurality of antenna modules arranged apart from each other, calculating, by using beamforming simulation data prestored in the millimeter wave communication device, a phase value for performing beamforming based on a phase shift with respect to the base station by each of the plurality of antenna modules, recognizing an operation state change of the first antenna module in operation, performing antenna switching from the first antenna module to a second antenna module among the plurality of antenna modules according to the recognized operation state change for continuity of data communication with the base station, and performing, by using the calculated phase value, beamforming for forming a communication channel with the base station by the second antenna module.

In an embodiment, the beamforming simulation data may include a phase correction value pre-obtained through simulation to correct a phase value for beamforming based on a position and angle at which each of the plurality of antenna modules is arranged and a direction of a beam directed to the base station when antenna switching is performed for continuity of data communication with the base station.

In an embodiment, the beamforming simulation data may be obtained by pre-calculation based on a code word included in a codebook prestored in the millimeter wave communication device, and the code word may include a phase shift matrix having a phase value for performing beamforming with respect to the base station as a variable.

In an embodiment, the recognizing of the operation state change of the first antenna module may include measuring a module temperature of the first antenna module according to a preset time period by using a temperature sensor.

In an embodiment, the recognizing of the operation state change of the first antenna module may further include detecting a first time point at which the measured module temperature of the first antenna module exceeds a preset threshold temperature, and the performing of the antenna switching may include switching from the first antenna module in operation to the second antenna module at the first time point.

In an embodiment, the method may further include detecting a second time point at which the measured module temperature of the first antenna module reaches a preset threshold range lower than a preset threshold temperature, and identifying whether calculation of the phase value for performing beamforming with respect to the base station by each of the plurality of antenna modules is completed at the second time point.

In an embodiment, the method may further include measuring a module temperature of each of the plurality of antenna modules by using a temperature sensor, wherein the performing of the antenna switching may include determining an antenna module to which switching is to be performed, as the second antenna module based on the module temperature of each of the plurality of antenna modules and whether calculation of the phase value is completed.

In order to solve the above technical problem, another embodiment of the disclosure provides a computer program product including a computer-readable storage medium having recorded thereon a program to be executed in a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 is a diagram for describing FIG. 13 in detail according to an embodiment of the disclosure.

Throughout the drawings, it should be noted that like reference numbers are used to depict the same or similar elements, features, and structures.

DETAILED DESCRIPTION

Figure 1:
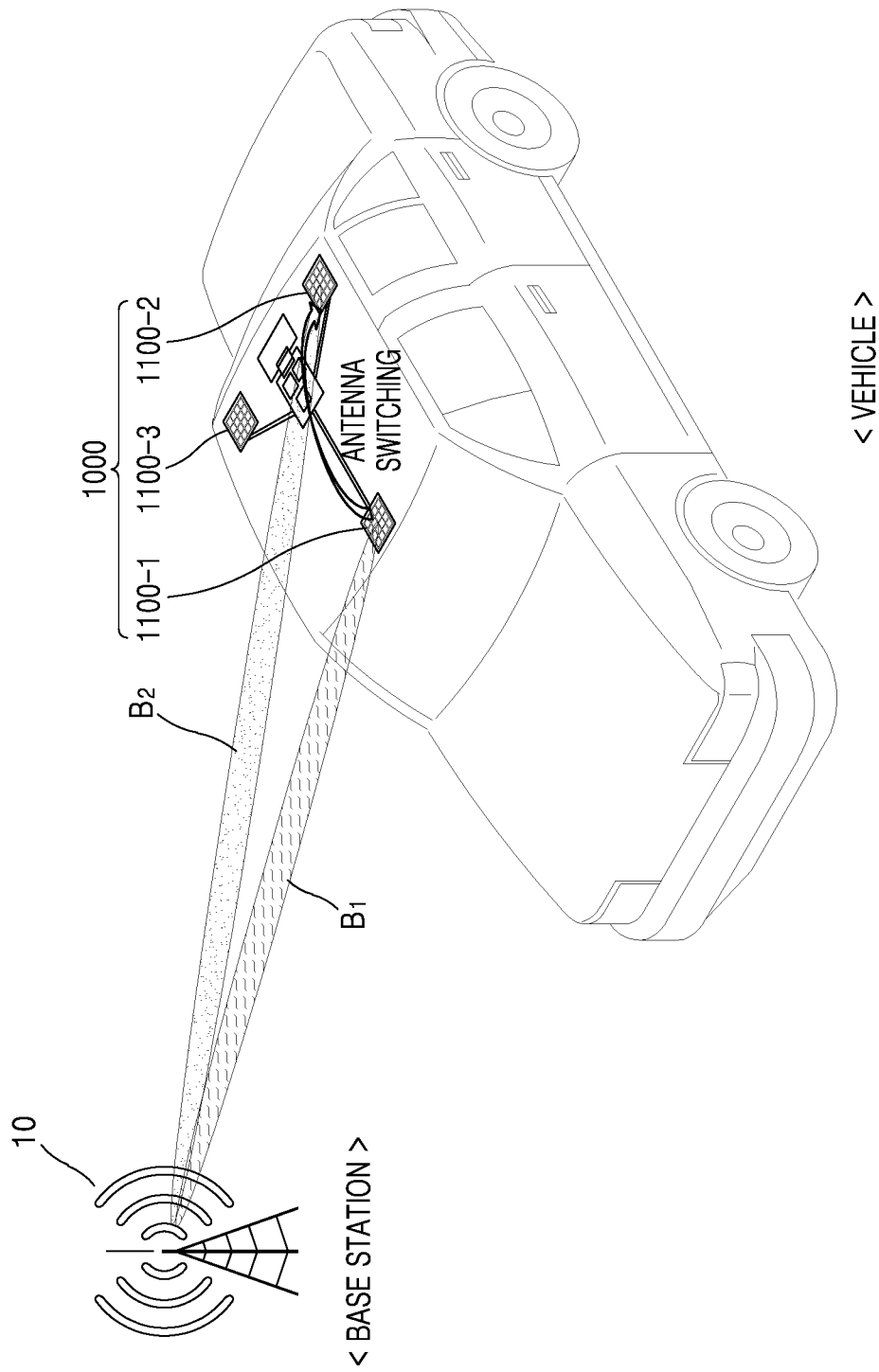
FIG. 1 is a conceptual diagram illustrating a method used by a millimeter wave communication device to form a communication channel with a base station when performing antenna switching according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a," "an," and "the" may include the plural forms as well, unless the context clearly indicates otherwise. Unless otherwise defined, all terms (including technical or scientific terms) used herein may have the same meanings as commonly understood by those of ordinary skill in the art of the disclosure.

Throughout the disclosure, when something is referred to as "including" an element, one or more other elements may be further included unless specified otherwise. Also, as used herein, terms such as "units" and "modules" may refer to units that perform at least one function or operation, and the units may be implemented as hardware or software or a combination of hardware and software.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some case, the expression "a system configured to . . . " may mean that the system is "capable of . . . " along with other devices or components. For example, "a processor configured to (or set to) perform A, B, and C" may refer to a dedicated processor (e.g., an embedded processor) for performing a corresponding operation, or a general-purpose processor (e.g., a central processing unit (CPU) or an application processor) capable of performing corresponding operations by executing one or more software programs stored in a memory.

FIG. 1 is a conceptual diagram illustrating a method used by a millimeter wave communication device to form a communication channel with a base station when performing antenna switching according to an embodiment of the disclosure.

Referring to FIG. 1, the millimeter wave communication device 1000 may include a plurality of antenna modules 1100-1, 1100-2, and 1100-3. The plurality of antenna modules 1100-1, 1100-2, and 1100-3 may be mounted on an external structure of a vehicle 100 or arranged in the external structure. In the embodiment illustrated in FIG. 1, the plurality of antenna modules 1100-1, 1100-2, and 1100-3 may be respectively arranged at metal structures constituting the roof of the vehicle 100. The plurality of antenna modules 1100-1, 1100-2, and 1100-3 may be arranged apart from each other.

The plurality of antenna modules 1100-1, 1100-2, and 1100-3 may be configured as millimeter wave (mmWave) antennas for performing millimeter wave (mmWave) communication with the base station. In an embodiment, the plurality of antenna modules 1100-1, 1100-2, and 1100-3 may include an array antenna including a plurality of millimeter wave antenna elements. Each of the plurality of antenna modules 1100-1, 1100-2, and 1100-3 may include a plurality of array antennas.

Among the plurality of antenna modules 1100-1, 1100-2, and 1100-3, a first antenna module 1100-1 may form a millimeter wave (mmWave) communication channel with the base station 10 by using a plurality of array antennas and transmit/receive data on the communication channel. In an embodiment, the first antenna module 1100-1 may form a communication channel with the base station 10 through beamforming using a phase shift method. The first antenna module 1100-1 may form a communication channel with the base station 10 through a first beam $B_1$.

The millimeter wave communication device 1000 may recognize an operation state change of the first antenna module 1100-1 in operation and perform antenna switching to any one of a second antenna module 1100-2 and a third antenna modules 1100-3 for continuity of data communication with the base station 10. In an embodiment, the operation state change may include at least one of the position and direction changes of the first antenna module 1100-1 with respect to the base station 10 due to the movement of the vehicle 100 or the temperature increase of the first antenna module 1100-1 in operation. In an embodiment, the millimeter wave communication device 1000 may recognize whether the module temperature of the first antenna module 1100-1 exceeds a preset threshold temperature and perform antenna switching based on the recognition result. In the embodiment illustrated in FIG. 1, the millimeter wave communication device 1000 may perform antenna switching from the first antenna module 1100-1 to the second antenna module 1100-2.

The second antenna module 1100-2 may sense the position of the base station 10 through beam searching and perform beamforming with respect to the base station 10. The second antenna module 1100-2 may form a communication channel with the base station 10 through a second beam $B_2$.

In an embodiment, based on the position and angle at which each of the plurality of antenna modules 1100-1, 1100-2, 1100-3 is arranged and the direction of a beam directed to the base station 10, the millimeter wave communication device 1000 may store beamforming simulation data pre-obtained through simulation in order to correct a phase value for beamforming. The beamforming simulation data may include data about a phase correction value for correcting the phase value of the antenna module before switching by considering the position and angle of the antenna module switched during antenna switching and the direction of the beam directed to the base station 10. In an embodiment, when antenna switching is performed, by using the prestored beamforming simulation data, the millimeter wave communication device 1000 may calculate a phase value such that the second antenna module 1100-2 may perform beamforming toward the base station 10.

Because the plurality of antenna modules 1100-1, 1100-2, 1100-3 are arranged apart from each other and the arrangement positions and directions thereof are different from each other, the direction of the first beam $B_1$ through which the first antenna module 1100-1 forms a communication channel with the base station 10 and the direction of the second beam $B_2$ through which the second antenna module 1100-2 forms a communication channel with the base station 10 may be different from each other. When antenna switching is performed from the first antenna module 1100-1 to the second antenna module 1100-2, the second antenna module 1100-2 should perform beam searching for sensing the position of the base station 10 and data communication may be disconnected or data may be lost during the time period before the position of the base station 10 is searched for.

The millimeter wave communication device 1000 according to an embodiment of the disclosure may eliminate the time required for beam searching and perform seamless data communication by calculating a phase value for performing beamforming toward the base station 10 by an antenna module to which switching has been performed, that is, the second antenna module 1100-2, by using the beamforming simulation data pre-obtained through simulation when antenna switching is performed.

The operating method illustrated in FIG. 1 may be similarly applied even when antenna switching is performed from the first antenna module 1100-1 to the third antenna module 1100-3.

Figure 2:
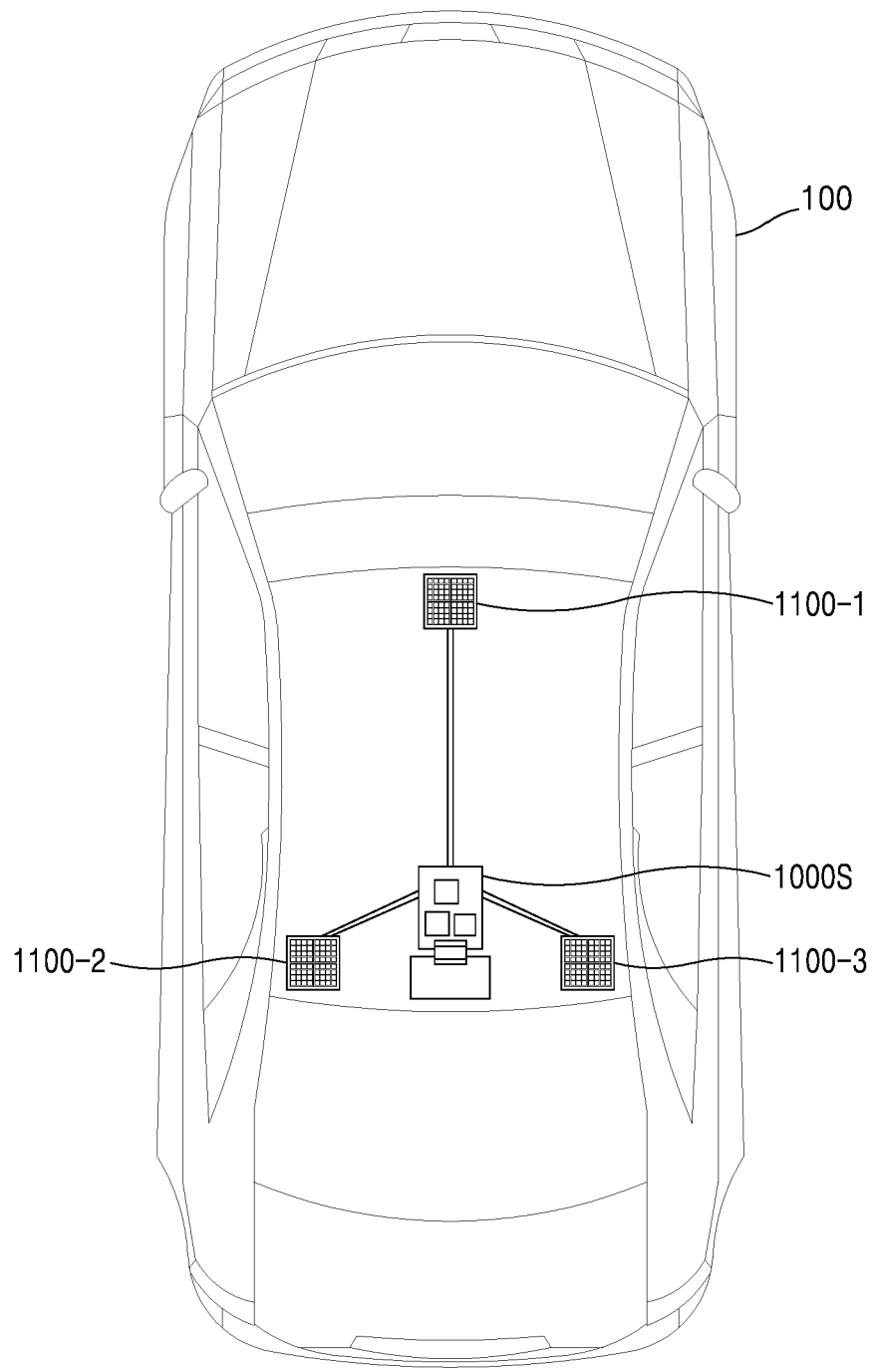
FIG. 2 is a diagram illustrating a structure in which a millimeter wave communication device is arranged in a vehicle according to an embodiment of the disclosure.

FIG. 2 is a diagram illustrating a structure in which a millimeter wave communication device is arranged in a vehicle according to an embodiment of the disclosure.

Referring to FIG. 2, the millimeter wave communication device 1000 may include a plurality of antenna modules 1100-1, 1100-2, and 1100-3, and the plurality of antenna modules 1100-1, 1100-2, and 1100-3 may be mounted on an external structure of the vehicle 100. In an embodiment, the plurality of antenna modules 1100-1, 1100-2, and 1100-3 may be respectively arranged at metal structures constituting the roof of the vehicle 100. However, the disclosure is not limited thereto, and the plurality of antenna modules 1100-1, 1100-2, and 1100-3 may also be arranged at the bonnet, bumper, pillar, or trunk of the vehicle 100.

The plurality of antenna modules 1100-1, 1100-2, and 1100-3 may be arranged apart from each other by a preset distance. In an embodiment illustrated in FIG. 2, a first antenna module 1100-1 may be arranged at a portion adjacent to the wind screen of the roof of the vehicle 100, and a second antenna module 1100-2 and a third antenna module 1100-3 may be arranged at a roof adjacent to the C pillar of the vehicle 100.

Although a total of three antenna modules 1100-1, 1100-2, and 1100-3 are illustrated in FIG. 2, the disclosure is not limited thereto. For example, the plurality of antenna modules 1100-1, 1100-2, and 1100-3 may include two or four or more antenna modules.

The plurality of antenna modules 1100-1, 1100-2, and 1100-3 may be electrically and/or physically connected through a device substrate 1000S. A switching circuit 1200 (see FIG. 3), an intermediate frequency integrated circuit (IFIC) 1300 (see FIG. 3), and a modem 1400 (see FIG. 3) may be mounted on the device substrate 1000S. In an embodiment, the plurality of antenna modules 1100-1, 1100-2, and 1100-3 may be connected to the switching circuit 1200 through the device substrate 1000S.

The structure of components constituting the millimeter wave communication device 1000 will be described in detail with reference to FIG. 3.

Figure 3:
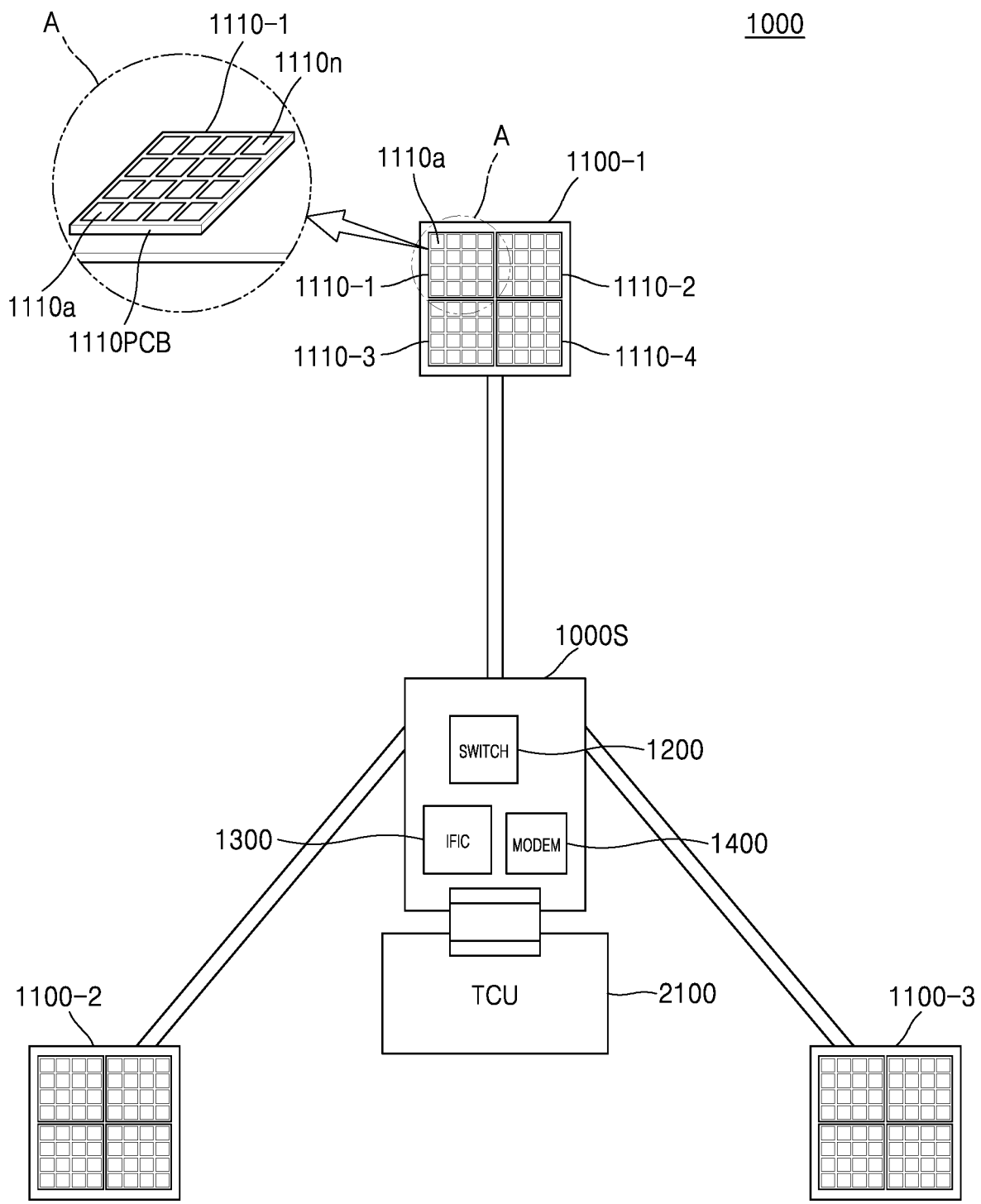
FIG. 3 is a diagram illustrating a structure of components included in a millimeter wave communication device according to an embodiment of the disclosure.

FIG. 3 is a diagram illustrating a structure of components included in a millimeter wave communication device according to an embodiment of the disclosure.

Referring to FIG. 3, the millimeter wave communication device 1000 may include a plurality of antenna modules 1100-1, 1100-2, and 1100-3, a switching circuit 1200, an IFIC 1300, and a modem 1400.

Each of the plurality of antenna modules 1100-1, 1100-2, and 1100-3 may be connected to a device substrate 1000S through a cable.

Each of the plurality of antenna modules 1100-1, 1100-2, and 1100-3 may include a plurality of array antennas 1110-1 to 1110-4. Referring to region A of FIG. 3, a first antenna module 1100-1 may include a plurality of array antennas 1110-1 to 1110-4.

The plurality of array antennas 1110-1 to 1110-4 may be phase array antennas. A first array antenna 1110-1 may be configured as a package including a flexible printed circuit board (FPCB) 1110PCB and a plurality of antenna elements 1110a to 1110n arranged on the FPCB 1110PCB. The plurality of antenna elements 1110a to 1110n may be millimeter wave (mmWave) antennas. Although not illustrated, a radio frequency (RF) integrated circuit (RFIC) may be embedded in the FPCB 1110PCB, and an RF chip may be electrically and/or physically connected to the plurality of antenna elements 1110a to 1110n through a solder ball.

The first array antenna 1110-1 may include, for example, a total of 16 antenna elements 1110a to 1110n arranged in 4×4, and the first antenna module 1100-1 may include a total of four array antennas 1110-1 to 1110-4. For example, the first antenna module 1100-1 may include a total of 64 antenna elements 1110a to 1110n arranged in 8×8; however, the disclosure is not limited thereto.

Although not illustrated, each of the plurality of antenna modules 1100-1, 1100-2, and 1100-3 may include at least one of an RFIC, a power amplifier, an attenuator, a converter, and a temperature sensor. At least one of the RFIC, the power amplifier, the attenuator, the converter, and the temperature sensor may be mounted on a printed circuit board and electrically connected to each other.

The switching circuit 1200, the IFIC 1300, and the modem 1400 may be mounted on the device substrate 1000S and integrated in the form of a package. The device substrate 1000S may be connected to a telematics control unit (TCU) 2100 of a vehicle through a cable. The modem 1400 may transmit/receive control data to/from the TCU 2100 through the device substrate 1000S.

The operations or functions of the switching circuit 1200, the IFIC 1300, and the modem 1400 will be described in detail with reference to FIGS. 4A and 4B.

Figure 4A:
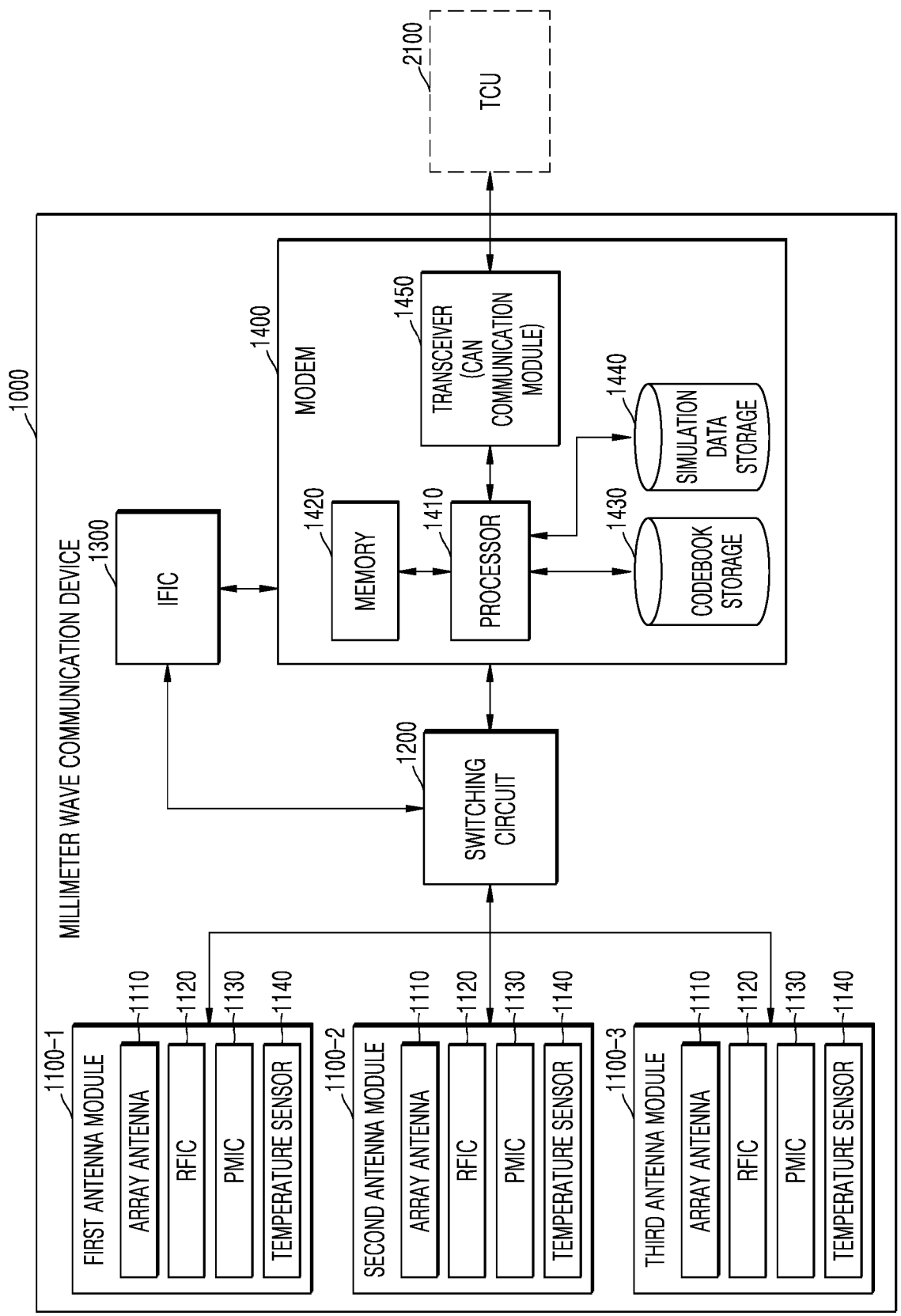
FIG. 4A is a block diagram illustrating components of a millimeter wave communication device according to an embodiment of the disclosure.

FIG. 4A is a block diagram illustrating components of a millimeter wave communication device according to an embodiment of the disclosure.

Referring to FIG. 4A, the millimeter wave communication device 1000 may include a first antenna module 1100-1, a second antenna module 1100-2, a third antenna module 1100-3, a switching circuit 1200, an IFIC 1300, and a modem 1400.

The first antenna module 1100-1 may include at least one array antenna 1110, an RFIC 1120, a power management circuit (PMIC) 1130, and a temperature sensor 1140. The first antenna module 1100-1 may transmit/receive data on a communication channel formed with a base station by using the at least one array antenna 1110. The at least one array antenna 1110 may include a plurality of antenna elements. The plurality of antenna elements may be millimeter wave (mmWave) antennas capable of transmitting/receiving data in a frequency band of about 30 gigahertz (GHz) to about 300 GHz.

The at least one array antenna 1110 may be a phase array antenna configured to adjust the direction of a main beam by adjusting a phase delay of a transmission signal applied to the plurality of antenna elements by using data about a phase value received from the modem 1400.

The RFIC 1120 may be a circuit configured to process an RF signal transmitted/received by the first antenna module 1100-1.

The power management circuit 1130 may be a circuit configured to apply power to the first antenna module 1100-1, control the power applied, and detect an overvoltage or an undervoltage. In an embodiment, the power management circuit 1130 may include at least one of a voltage regulator, a surge protection circuit, a power sensing circuit, and an auxiliary power supply. By using the power sensing circuit, the power management circuit 1130 may sense whether the first antenna module 110-1 has an overvoltage or an undervoltage.

In an embodiment, the power management circuit 1130 may further include a power amplifier (PA). The power amplifier may amplify the power of a transmission signal transmitted from the first antenna module 1100-1 to the base station. Because the power amplifier amplifies the power of the transmission signal, heat may be generated in the power amplifier.

The temperature sensor 1140 may measure the module temperature of the first antenna module 1100-1. In an embodiment, the temperature sensor 1140 may periodically measure the temperature of the first antenna module 1100-1 according to a preset time period. In an embodiment, the temperature sensor 1140 may be connected to the power amplifier and may measure the module temperature of the first antenna module 1100-1 due to the heat generated in the power amplifier. The temperature sensor 1140 may transmit information about the measured temperature of the first antenna module 1100-1 to the modem 1400.

The temperature sensor 1140 may include, for example, a thermistor. The thermistor may be a semiconductor device whose resistance value varies depending on temperature. The thermistor may measure the module temperature of the first antenna module 1100-1 by converting a thermal signal into an electrical signal. However, the disclosure is not limited thereto, and the temperature sensor 1140 may include a diode whose forward voltage varies according to temperature, a bipolar transistor, or the like.

Like the first antenna module 1100-1, the second antenna module 1100-2 and the third antenna module 1100-3 may include at least one array antenna 1110, an RFIC 1120, a power management circuit 1130, and a temperature sensor 1140. Because the second antenna module 1100-2 and the third antenna module 1100-3 are similar to the first antenna module 110-1, redundant descriptions thereof will be omitted for conciseness.

The first antenna module 1100-1, the second antenna module 1100-2, and the third antenna module 1100-3 may be arranged apart from each other by a preset distance.

The switching circuit 1200 may be connected to the first antenna module 1100-1, the second antenna module 1100-2, and the third antenna module 1100-3 and may perform antenna switching by selecting any one of the antenna module 1100-1, the second antenna module 1100-2, and the third antenna module 1100-3 under control by the modem 1400. The antenna module selected through the switching circuit 1200 may be put into an operation state, and the other antenna modules may be switched into a standby state. The antenna module selected by the switching circuit 1200 may form a communication channel with the base station and transmit/receive data.

The IFIC 1300 may convert a frequency band of a transmission/reception signal. The IFIC 1300 may convert the baseband frequency band into the intermediate frequency in order to convert the baseband frequency band into the frequency band used by a plurality of antenna modules 1100-1, 1100-2, and 1100-3 including millimeter wave antenna elements. For example, when the baseband frequency band is a frequency band of more than 4.5 GHz and less than 6 GHz, and the frequency band used by the millimeter wave antenna element is a frequency band of more than 26 GHz and less than 28 GHz, the IFIC 1300 may convert the baseband frequency band into a frequency band of more than 8 GHz and less than 10 GHz that is the intermediate frequency band. The IFIC 1300 may include a bandwidth up-converter and a bandwidth down-converter.

The modem 1400 may be electrically and/or physically connected to the plurality of antenna modules 1100-1, 1100-2, and 1100-3, the switching circuit 1200, and the IFIC 1300 and may control the operations or functions of the plurality of antenna modules 1100-1, 1100-2, and 1100-3, the switching circuit 1200, and the IFIC 1300. The modem 1400 may include a processor 1410, a memory 1420, a codebook storage 1430, a simulation data storage 1440, and a transceiver 1450.

The processor 1410 may execute one or more instructions of the program stored in the memory 1420. The processor 1410 may include hardware components for performing arithmetic, logic, and input/output operations and signal processing. The processor 1410 may include, for example, at least one of a central processing unit (CPU), a microprocessor, a graphic processor (graphic processing unit (GPU)), application specific integrated circuits (ASICs), digital signal processors (DSPs), digital signal processing devices (DSPDs), programmable logic devices (PLDs), and field programmable gate arrays (FPGAs); however, the disclosure is not limited thereto. In an embodiment, the processor 1410 may include a communication processor (CP).

The memory 1420 may include, for example, a nonvolatile memory including at least one of flash memory type, hard disk type, multimedia card micro type, or card type memory (e.g., secure digital (SD) or extreme digital (XD) memory), read-only memory (ROM), electronically erasable programmable read-only memory (EEPROM), and programmable read-only memory (PROM) and a volatile memory such as random-access memory (RAM) or static random-access memory (SRAM).

The memory 1420 may store instructions, data structures, and program codes readable by the processor 1410. In the following embodiments, the processor 1410 may be implemented by executing the instructions or codes of the program stored in the memory. For example, the memory 1420 may store program codes or instructions for calculating a phase value for performing beamforming with respect to the base station by each of the plurality of antenna modules 1100-1, 1100-2, and 1100-3 by using the beamforming simulation data prestored in the simulation data storage 1440, recognizing an operation state change of the first antenna module 1100-1 in operation among the plurality of antenna modules 1100-1, 1100-2, and 1100-3, performing antenna switching from the first antenna module 1100-1 to the second antenna module 1100-2 according to the recognized operation state change, and performing beamforming for forming a communication channel with the base station by the second antenna module 1100-2 by using the calculated phase value.

In an embodiment, by executing the program code or instruction stored in the memory 1420, by using the beamforming simulation data stored in the simulation data storage 1440, the processor 1410 may calculate a phase value for performing beamforming based on a phase shift with respect to the base station by each of the plurality of antenna modules 1100-1, 1100-2, and 1100-3.

Here, the beamforming simulation data may include beamforming-related data pre-obtained through simulation based on the arrangement position and angle of each of the plurality of antenna modules 1100-1, 1100-2, and 1100-3 and the direction of a beam directed to the base station such that data communication may be seamlessly and continuously maintained even when antenna switching is performed. The beamforming simulation data may include data about a phase value for allowing each of the plurality of antenna modules 1100-1, 1100-2, and 1100-3 to perform beamforming toward the base station. The processor 1410 may pre-calculate a phase value for performing beamforming with respect to the base station by the antenna module on standby by considering position information about the arrangement positions and angles of the plurality of antenna modules 1100-1, 1100-2, and 1100-3 and the direction of the beam formed between the antenna module in operation and the base station before antenna switching is performed and store the calculated phase value data in the simulation data storage 1440. The phase value data stored in the simulation data storage 1440 may be data about a correction value for, after a phase value for performing beamforming for forming a communication channel with respect to the base station by the antenna module in operation is determined as a reference phase value, correcting a phase value based on the reference phase value so that a candidate antenna module to be selected as an operating antenna module due to antenna switching may perform beamforming with respect to the same base station.

The codebook storage 1430 may store a codebook including a code word that is a phase shift matrix having a phase value for performing beamforming with respect to the base station by each of the plurality of antenna modules 1100-1, 1100-2, and 1100-3 as a variable. A phase shift matrix may be determined by using a plurality of phase values included in the codebook storage 1430, a code word index may be determined through an operation of multiplying each phase shift matrix by a vector component according to communication channel information, and beamforming based on the codebook may be performed by using the determined code word index.

In an embodiment, the processor 1410 may calculate beamforming simulation data based on the code word stored in the codebook storage 1430.

The codebook storage 1430 and the simulation data storage 1440 may include a nonvolatile memory. For example, the codebook storage 1430 and the simulation data storage 1440 may include a nonvolatile memory including at least one of flash memory, hard disk, multimedia card micro, or card type memory (e.g., SD or XD memory), read-only memory (ROM), electrically erasable programmable read-only memory (EEPROM), and programmable read-only memory (PROM).

In an embodiment, the processor 1410 may recognize an operation state change of the antenna module among the plurality of antenna modules 1100-1, 1100-2, and 1100-3, which is performing an operation of transmitting/receiving data by forming a communication channel with the base station. For example, when the antenna module in operation is the first antenna module 1100-1, the processor 1410 may recognize a temperature increase of the first antenna module 1100-1 or may recognize a change in at least one of the position and direction of the first antenna module 1100-1 due to the movement of a vehicle.

In an embodiment, the processor 1410 may obtain position coordinate value information of the vehicle from a global positioning system (GPS) sensor included in a TCU 2100 of the vehicle and recognize a change in at least one of the position and direction of the vehicle by using the obtained position coordinate value information of the vehicle.

The processor 1410 may obtain information about the module temperature of each of the plurality of antenna modules 1100-1, 1100-2, and 1100-3 from the temperature sensor 1140 included in each of the plurality of antenna modules 1100-1, 1100-2, and 1100-3. In an embodiment, the processor 1410 may periodically obtain the module temperature measured by the temperature sensor 1140 according to a preset time period.

According to the recognized operation state change, the processor 1410 may control the switching circuit 1200 to perform antenna switching from the first antenna module 1100-1 in operation to any one of the plurality of antenna modules 1100-1, 1100-2, and 1100-3. In an embodiment, the processor 1410 may control the switching circuit 1200 to perform antenna switching when the module temperature of the first antenna module 1100-1 in operation exceeds a preset threshold temperature.

The processor 1410 may determine the antenna module to which switching is to be performed, based on the module temperature of each of the plurality of antenna modules 1100-1, 1100-2, and 1100-3 and whether calculation of the phase value is completed. In an embodiment, the processor 1410 may determine the antenna module among the plurality of antenna modules 1100-1, 1100-2, and 1100-3, the measured module temperature of which is lowest and on which calculation of the phase value by using the beamforming simulation data stored in the simulation data storage 1440 is completed, as the antenna module to which switching is to be performed. For example, the processor 1410 may determine the second antenna module 1100-2 as the antenna module to which switching is to be performed and control the switching circuit 1200 such that the switching circuit 1200 may be disconnected from the first antenna module 110-1 and connected to the antenna module 1100-2.

By using the calculated phase value, the processor 1410 may control the second antenna module 1100-2 to perform beamforming for forming a communication channel with the base station. Because the processor 1410 has previously calculated a phase value for performing beamforming with respect to the base station by the second antenna module 1100-2 before antenna switching, the millimeter wave communication device 1000 may provide seamless data communication even when antenna switching is performed from the first antenna module 1100-1 to the second antenna module 1100-2.

The transceiver 1450 may perform data communication between the millimeter wave communication device 1000 and the TCU 2100 mounted on the vehicle. In an embodiment, the millimeter wave communication device 1000 may perform communication with the TCU 2100 according to a controller area network (CAN). In an embodiment, by performing CAN communication, the transceiver 1450 may transmit data obtained through at least one of the plurality of antenna modules 1100-1, 1100-2, and 1100-3. For example, the transceiver 1450 may transmit, to the TCU 2100, data for autonomous driving of the vehicle, high-resolution map data, or vehicle operating system update data received through an over-the-air (OTA) method. In an embodiment, the transceiver 1450 may receive at least one of position information of the vehicle (e.g., GPS position data), map information, and sensing information of the vehicle from the TCU 2100.

The TCU 2100 may be a system for controlling the vehicle and may be embedded in the vehicle. The TCU may include, for example, a GPS unit for obtaining latitude and longitude values according to the movement or stopping of the vehicle, and a communication interface for mobile communication (e.g., global system for mobile communication (GSM), wireless fidelity (WiFi), world interoperability for microwave access (WiMax), or long term evolution (LTE) network interface) for providing the obtained position coordinate values to a geographic information system (GIS).

Figure 4B:
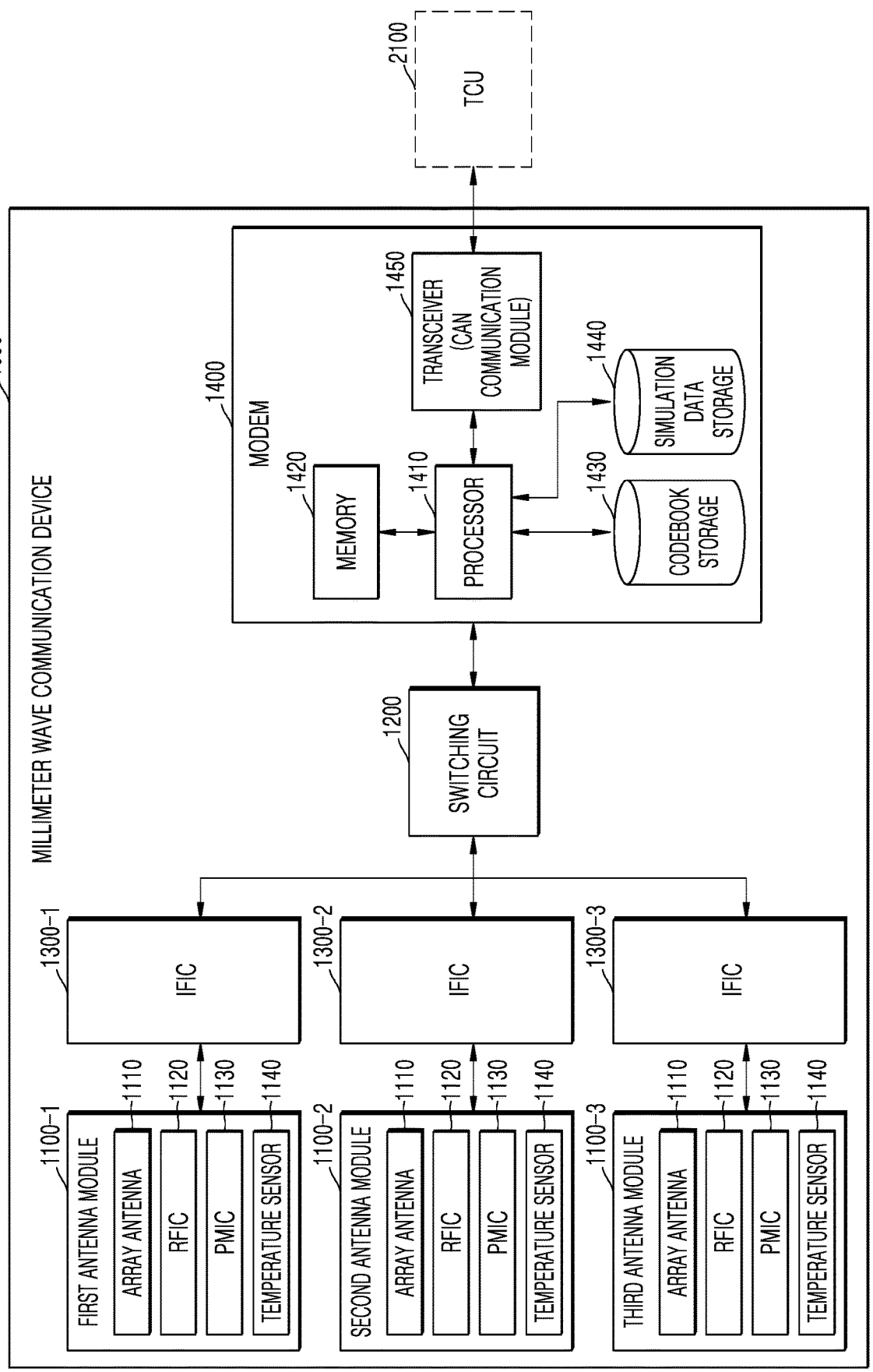
FIG. 4B is a block diagram illustrating components of a millimeter wave communication device according to an embodiment of the disclosure.

FIG. 4B is a block diagram illustrating components of a millimeter wave communication device according to an embodiment of the disclosure.

Referring to FIG. 4B, the millimeter wave communication device 1000' may include a first antenna module 1100-1, a second antenna module 1100-2, a third antenna module 1100-3, a switching circuit 1200, a plurality of IFICs 1300-1 to 1300-3, and a modem 1400.

Because the first antenna module 1100-1, the second antenna module 1100-2, the third antenna module 1100-3, the switching circuit 1200, and the modem 1400 illustrated in FIG. 4B are the same as those illustrated in FIG. 4A, redundant descriptions thereof will be omitted for conciseness.

In FIG. 4B, the millimeter wave communication device 1000' may include a plurality of IFICs 1300-1 to 1300-3. A first IFIC 1300-1 may be electrically and/or physically connected to the first antenna module 1100-1. The first IFIC 1300-1 may convert a frequency band of signals transmitted/received through the first antenna module 1100-1. The first IFIC 1300-1 may convert the baseband frequency band into the intermediate frequency in order to convert the baseband frequency band into the frequency band used by the first antenna module 1100-1 including millimeter wave antenna elements. For example, when the baseband frequency band is a frequency band of more than 4.5 GHz and less than 6 GHz, and the frequency band used by the millimeter wave antenna element is a frequency band of more than 26 GHz and less than 28 GHz, the first IFIC 1300-1 may convert the baseband frequency band into a frequency band of more than 8 GHz and less than 10 GHz that is the intermediate frequency band.

Likewise, a second IFIC 1300-2 and a third IFIC 1300-3 may be respectively connected to the second antenna module 1100-2 and the third antenna module 1100-3 and may convert a frequency band of transmission/reception signals.

Unlike the illustration in FIG. 4A, in the millimeter wave communication device 1000' illustrated in FIG. 4B, because the plurality of IFICs 1300-1 to 1300-3 are respectively connected to the plurality of antenna modules 1100-1 to 1100-3, a data loss that may occur when data is transferred between the antenna module and the modem 1400 may be reduced.

Figure 5:
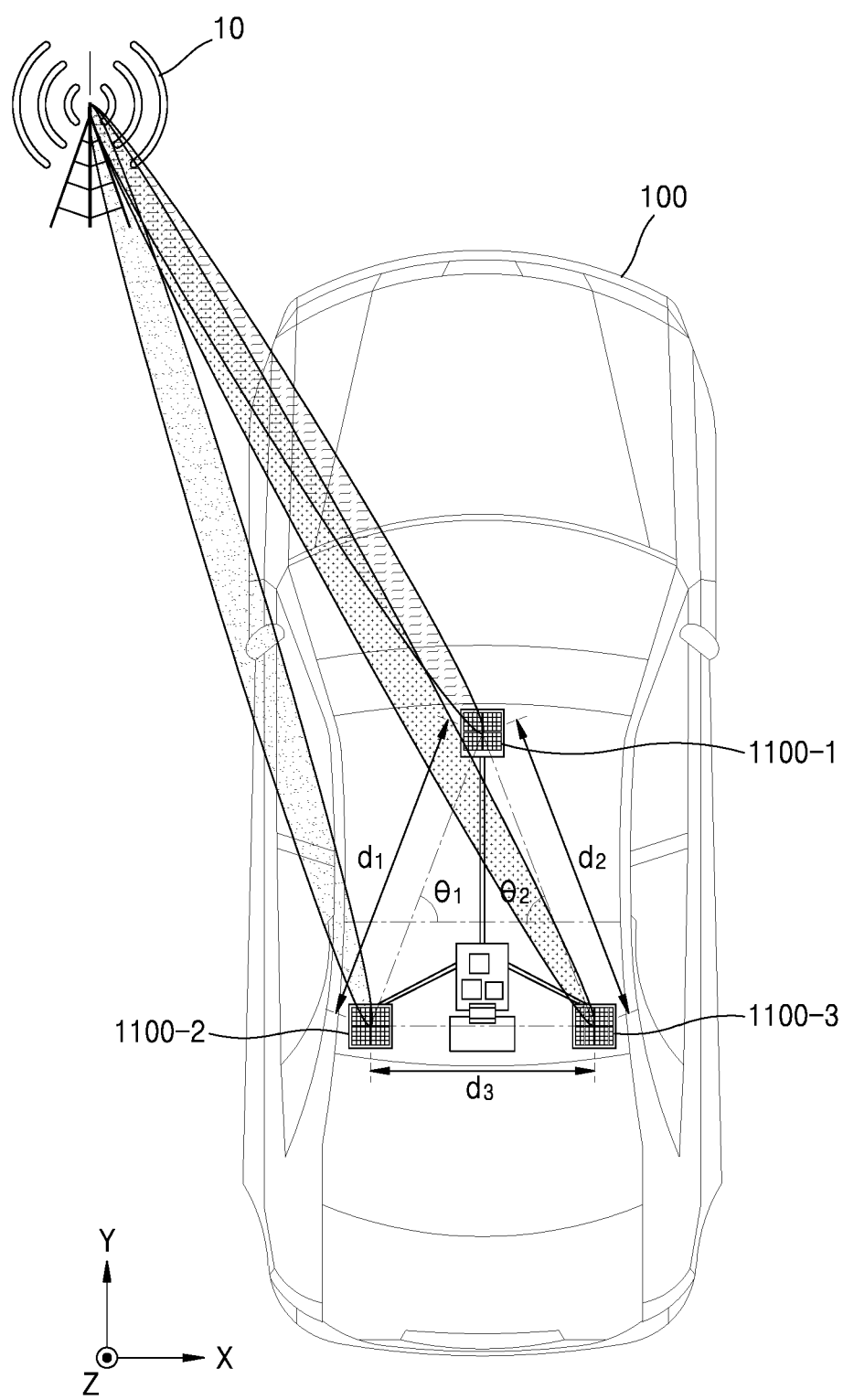
FIG. 5 is a diagram illustrating an embodiment in which a millimeter wave communication device forms a communication channel with a base station when performing antenna switching according to an embodiment of the disclosure.

FIG. 5 is a diagram illustrating an embodiment in which a millimeter wave communication device forms a communication channel with a base station 10 when performing antenna switching according to an embodiment of the disclosure.

Referring to FIG. 5, a plurality of antenna modules 1100-1, 1100-2, and 1100-3 may be arranged at an external structure of a vehicle 100 and may be arranged apart from each other by a preset distance. In the embodiment illustrated in FIG. 5, a first antenna module 1100-1 may be arranged apart from a second antenna module 1100-2 by a first distance $d_1$ and may be arranged apart from a third antenna module 1100-3 by a second distance $d_2$. The second antenna module 1100-2 and the third antenna module 1100-3 may be arranged apart from each other by a third distance $d_3$.

In an embodiment, the plurality of antenna modules 1100-1, 1100-2, and 1100-3 may be arranged to form a preset angle with respect to each other. For example, with respect to an X axis, the first antenna module 1100-1 may be arranged to form a first angle $\theta_1$ with respect to the second antenna module 1100-2 and to form a second angle $\theta_2$ with respect to the third antenna module 1100-3.

Because the plurality of antenna modules 1100-1, 1100-2, 1100-3 are spaced apart from each other by a preset distance and are arranged to form a preset angle with respect to each other, the directions of beams for forming communication channels with respect to the same base station 10 respectively by the plurality of antenna modules 1100-1, 1100-2, and 1100-3 may be different from each other. When any one of the plurality of antenna modules 1100-1, 1100-2, and 1100-3 performs communication by forming a beam toward the base station 10 and is then switched to another antenna module, because the other antenna module, to which switching has been performed, should perform beam searching in order to perform beamforming with respect to the base station 10 and should calculate a phase value for beamforming with respect to the base station 10 even when the beam searching is completed, a latency may occur and communication may be disconnected or a data loss may occur. Particularly, when a lot of heat is generated in the antenna module in operation, switching is performed to another antenna module, and in this case, communication may be disconnected or a data loss may occur.

The millimeter wave communication device 1000 according to an embodiment of the disclosure may calculate a phase value for performing beamforming with respect to the base station 10 by the second antenna module 1100-2 and the third antenna module 1100-3 on standby among the plurality of antenna modules 1100-1, 1100-2, and 1100-3 before performing antenna switching when the module temperature of the first antenna module 1100-1 performing data communication by forming a communication channel with the base station 10 exceeds a preset temperature or when a change in the position and direction of the first antenna module 1100-1 is recognized, and perform beamforming with respect to the base station 10 by using the phase value pre-calculated with respect to the second antenna module 1100-2 when the second antenna module 1100-2 among the antenna modules on standby is selected through antenna switching. In an embodiment, by using the beamforming simulation data prestored in the simulation data storage 1440 (see FIGS. 4A and 4B), the millimeter wave communication device 1000 may calculate a phase value for performing beamforming with respect to the base station 10 by the second antenna module 1100-2. Thus, in the millimeter wave communication device 1000 of the disclosure, even when antenna switching is performed due to overheating of the antenna module in operation, communication with the base station 10 may not be disconnected, continuity thereof may be maintained, and a data loss may also be prevented. Also, the millimeter wave communication device 1000 of the disclosure may prevent the problem of a reduction in the power of a transmission signal due to overheating of the antenna module in operation.

Figure 6:
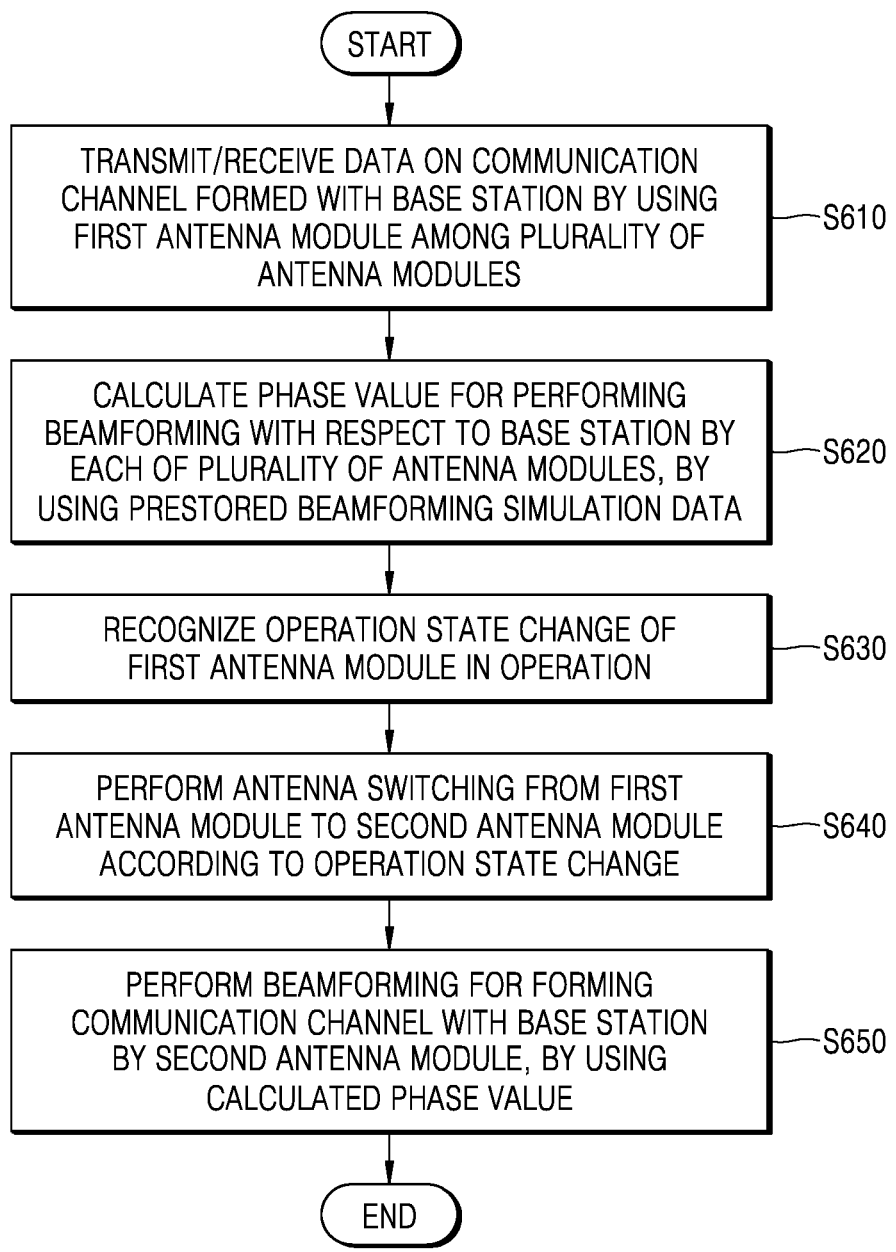
FIG. 6 is a flowchart illustrating an operating method of a millimeter wave communication device according to an embodiment of the disclosure.

FIG. 6 is a flowchart illustrating an operating method of a millimeter wave communication device according to an embodiment of the disclosure.

Referring to FIG. 6, in operation S610, the millimeter wave communication device 1000 may transmit/receive data by using a communication channel formed with a base station by using a first antenna module among a plurality of antenna modules. In an embodiment, the plurality of antenna modules may be arranged at an external structure of a vehicle and may be arranged apart from each other by a preset distance. Each of the plurality of antenna modules may include at least one array antenna, and the array antenna may include a plurality of antenna elements. The plurality of antenna elements may be millimeter wave (mmWave) antennas capable of transmitting/receiving data in a frequency band of about 30 GHz to about 300 GHz. The array antenna may be a phase array antenna configured to adjust the direction of a main beam by adjusting the phase delay of a transmission signal applied to the plurality of antenna elements. In an embodiment, the millimeter wave communication device 1000 may control the first antenna module to form a communication channel with the base station through beamforming with respect to the base station.

In operation S620, by using prestored beamforming simulation data, the millimeter wave communication device 1000 may calculate a phase value for performing beamforming with respect to the base station by each of the plurality of antenna modules. The beamforming simulation data may include beamforming-related data pre-obtained through simulation based on the arrangement position and angle of each of the plurality of antenna modules and the direction of a beam directed to the base station such that data communication may be seamlessly and continuously maintained even when antenna switching is performed. The beamforming simulation data may include a phase correction value for performing beamforming toward the base station by each of the plurality of antenna modules. In an embodiment, the millimeter wave communication device 1000 may determine a phase value for performing beamforming for forming a communication channel with respect to the base station by the antenna module in operation as a reference phase value, and it may be data about a correction value for correcting a phase value based on the reference phase value so that the antenna module on standby may perform beamforming with respect to the same base station.

In an embodiment, the beamforming simulation data may be obtained by being calculated based on the code word prestored in the codebook storage 1430 (see FIGS. 4A and 4B) of the millimeter wave communication device 1000. Here, the code word may refer to a phase shift matrix having a phase value for performing beamforming with respect to the base station by each of the plurality of antenna modules as a variable.

In operation S630, the millimeter wave communication device 1000 may recognize an operation state change of the first antenna module in operation. The operation state change may include, for example, at least one of the changes in the position and direction of the first antenna module due to the increase in the module temperature of the first antenna module and the movement of the vehicle. In an embodiment, the millimeter wave communication device 1000 may measure the module temperature of the first antenna module by using a temperature sensor included in the first antenna module and determine whether the measured module temperature exceeds a preset threshold temperature. In an embodiment, the millimeter wave communication device 1000 may measure the module temperature of the first antenna module according to a preset time period and obtain information about the periodically measured module temperature from the temperature sensor. When the module temperature of the first antenna module exceeds the preset threshold temperature, the millimeter wave communication device 1000 may determine that the operation state has changed.

In operation S640, the millimeter wave communication device 1000 may perform antenna switching from the first antenna module to a second antenna module according to the operation state change. In an embodiment, the millimeter wave communication device 1000 may switch the data transmission/reception path from the existing first antenna module to the second antenna module by using the switching circuit 1200 (see FIGS. 4A and 4B).

In operation S650, by using the calculated phase value, the millimeter wave communication device 1000 may perform beamforming for forming a communication channel with the base station by the second antenna module. In an embodiment, by using the phase correction value pre-calculated in operation S620, the millimeter wave communication device 1000 may correct a phase value for performing beamforming with respect to the same base station by the second antenna module to which switching has been performed, with respect to a reference phase value for performing beamforming with respect to the base station by the first antenna module. By using the corrected phase value, the millimeter wave communication device 1000 may control the second antenna module such that the second antenna module may perform beamforming with respect to the base station.

Figure 7:
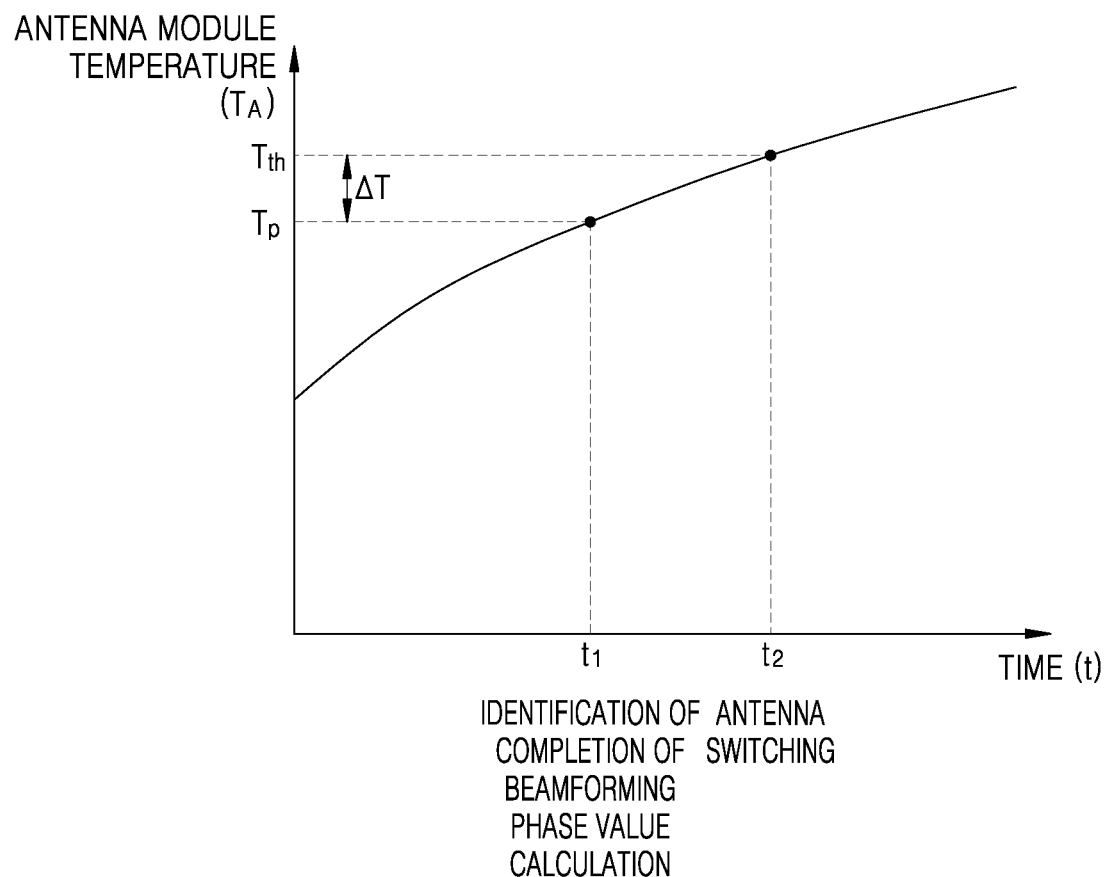
FIG. 7 is a graph illustrating the time-dependent module temperature of an antenna module in operation among a plurality of antenna modules included in a millimeter wave communication device according to an embodiment of the disclosure.

FIG. 7 is a graph illustrating the time-dependent module temperature of an antenna module in operation among a plurality of antenna modules included in a millimeter wave communication device according to an embodiment of the disclosure.

Referring to the graph illustrated in FIG. 7, the temperature of the antenna module in operation may increase with time. The millimeter wave communication device 1000 may measure the module temperature of the antenna module by using a temperature sensor included in the antenna module. In an embodiment, the millimeter wave communication device 1000 may periodically measure the module temperature of the antenna module according to a preset time period by using the temperature sensor.

The millimeter wave communication device 1000 may detect a first time point $t_1$ at which the module temperature of the antenna module in operation reaches a low threshold range $\Delta T$ from a preset threshold temperature $T_{th}$. The threshold range $\Delta T$ may refer to a range of temperatures lower by a preset temperature range from the threshold temperature $T_{th}$. In the graph illustrated in FIG. 7, the threshold range $\Delta T$ may refer to a range of a switching preparation temperature $T_p$ or more and the threshold temperature $T_{th}$ or less.

At the first time point $t_1$ when the module temperature of the antenna module in operation reaches the switching preparation temperature $T_p$, the millimeter wave communication device 1000 may identify whether calculation of a beamforming phase value for each of the other antenna modules other than the antenna module in operation among the plurality of antenna modules is completed. Among the components of the millimeter wave communication device 1000, the processor 1410 (see FIGS. 4A and 4B) of the modem 1400 (see FIGS. 4A and 4B) may calculate a phase value for performing beamforming with respect to the base station by at least one antenna module on standby among the plurality of antenna modules, by using the beamforming simulation data stored in the simulation data storage 1440 (see FIGS. 4A and 4B). In an embodiment, the processor 1410 may identify whether calculation of a phase value for each of the at least one antenna module on standby is completed at the first time point $t_1$.

The millimeter wave communication device 1000 may detect a second time point $t_2$ at which the module temperature of the antenna module in operation exceeds the preset threshold temperature $T_{th}$. At the second time point $t_2$, the millimeter wave communication device 1000 may change the antenna module in operation to any one of the antenna modules on standby by performing antenna switching. The processor 1410 may determine an antenna module to which switching is to be performed, based on the module temperature of each of the at least one antenna module on standby and whether calculation of the phase value is completed. In an embodiment, the processor 1410 may determine an antenna module among the at least one antenna modules on standby, the measured module temperature of which is lowest and on which calculation of the phase value by using the beamforming simulation data stored in the simulation data storage 1440 is completed, as an antenna module to which switching is to be performed.

Figure 8:
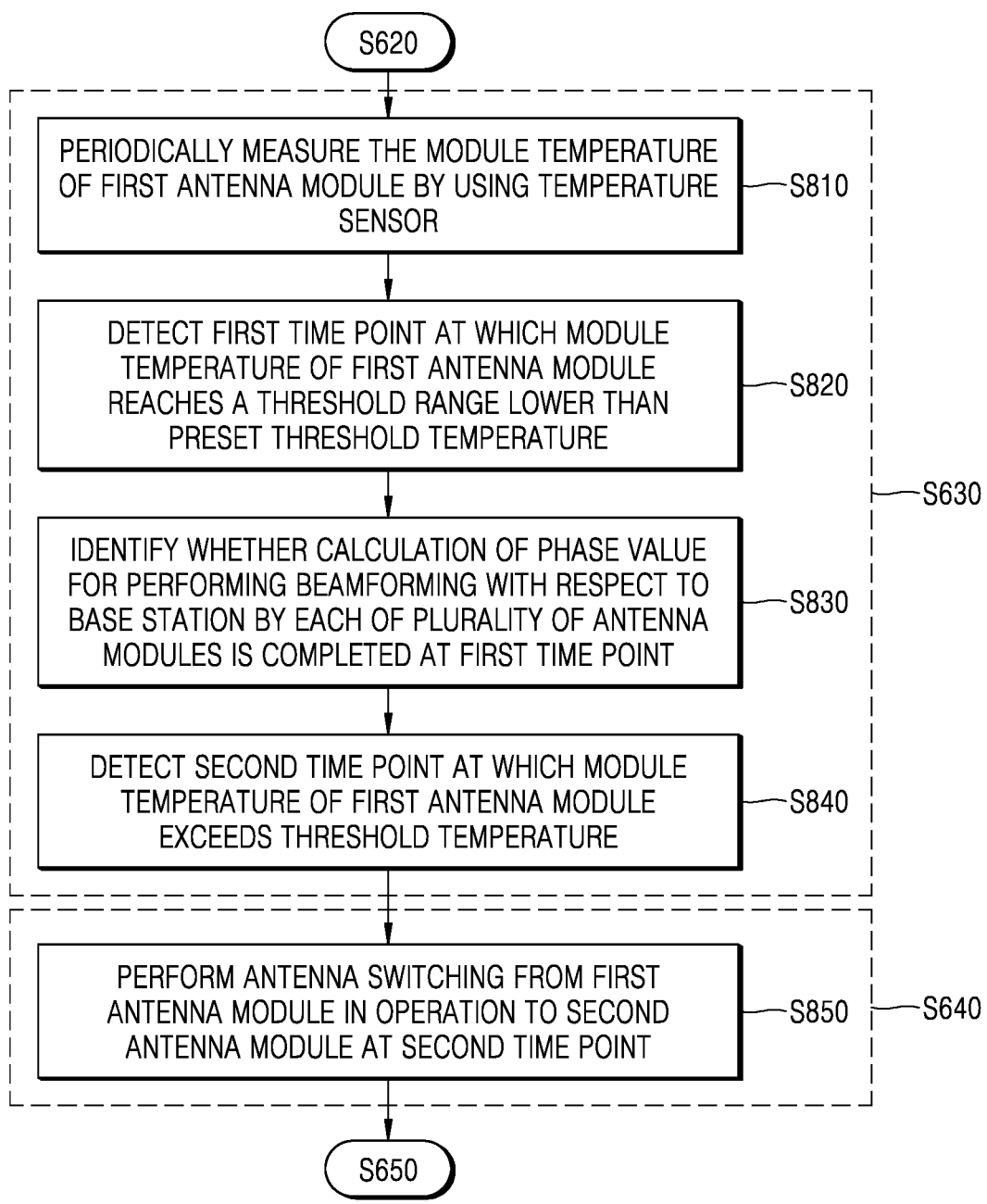
FIG. 8 is a flowchart illustrating an operating method of a millimeter wave communication device according to an embodiment of the disclosure.

FIG. 8 is a flowchart illustrating an operating method of a millimeter wave communication device according to an embodiment of the disclosure. Operations S810 to S840 illustrated in FIG. 8 may be detailed operations of operation S630 illustrated in FIG. 6. Operation S850 illustrated in FIG. 8 may be a particular embodiment of operation S640 illustrated in FIG. 6. Operation S810 illustrated in FIG. 8 may be performed after operation S620 illustrated in FIG. 6 is performed. Operation S650 illustrated in FIG. 6 may be performed after operation S850 illustrated in FIG. 8 is performed.

Referring to FIG. 8, in operation S810, the millimeter wave communication device 1000 may periodically measure the module temperature of the first antenna module by using the temperature sensor. In an embodiment, among the components of the millimeter wave communication device 1000, the processor 1410 (see FIGS. 4A and 4B) of the modem 1400 (see FIGS. 4A and 4B) may measure the module temperature of the first antenna module by using the temperature sensor included in the first antenna module that is the antenna module in operation. In an embodiment, the processor 1410 may periodically measure the module temperature of the first antenna module according to a preset time period.

In operation S820, the millimeter wave communication device 1000 may detect a first time point at which the module temperature of the first antenna module reaches a threshold range lower than a preset threshold temperature. Here, the threshold range may refer to a range of temperatures lower by a preset temperature range from the threshold temperature.

In operation S830, the millimeter wave communication device 1000 may identify whether calculation of a phase value for performing beamforming with respect to the base station by each of the plurality of antenna modules is completed at the first time point. In an embodiment, by using the beamforming simulation data stored in the simulation data storage 1440 (see FIGS. 4A and 4B), the processor 1410 may calculate a phase value for performing beamforming with respect to the same base station by a plurality of antenna modules on standby other than the first antenna module in operation among the plurality of antenna modules. In an embodiment, the processor 1410 may identify whether calculation of a phase value for each of the plurality of antenna modules on standby is completed at the first time point $t_1$.

In operation S840, the millimeter wave communication device 1000 may detect a second time point at which the module temperature of the first antenna module exceeds the threshold temperature.

In operation S850, the millimeter wave communication device 1000 may perform antenna switching from the first antenna module in operation to the second antenna module at the second time point. In an embodiment, the processor 1410 may change the first antenna module in operation to the second antenna module among the plurality of antenna modules on standby at a second time point by performing antenna switching. For example, the processor 1410 may determine the second antenna module as the antenna module to which switching is to be performed and control the switching circuit 1200 (see FIGS. 4A and 4B) such that the switching circuit 1200 may be disconnected from the first antenna module and connected to the second antenna module.

Figure 9:
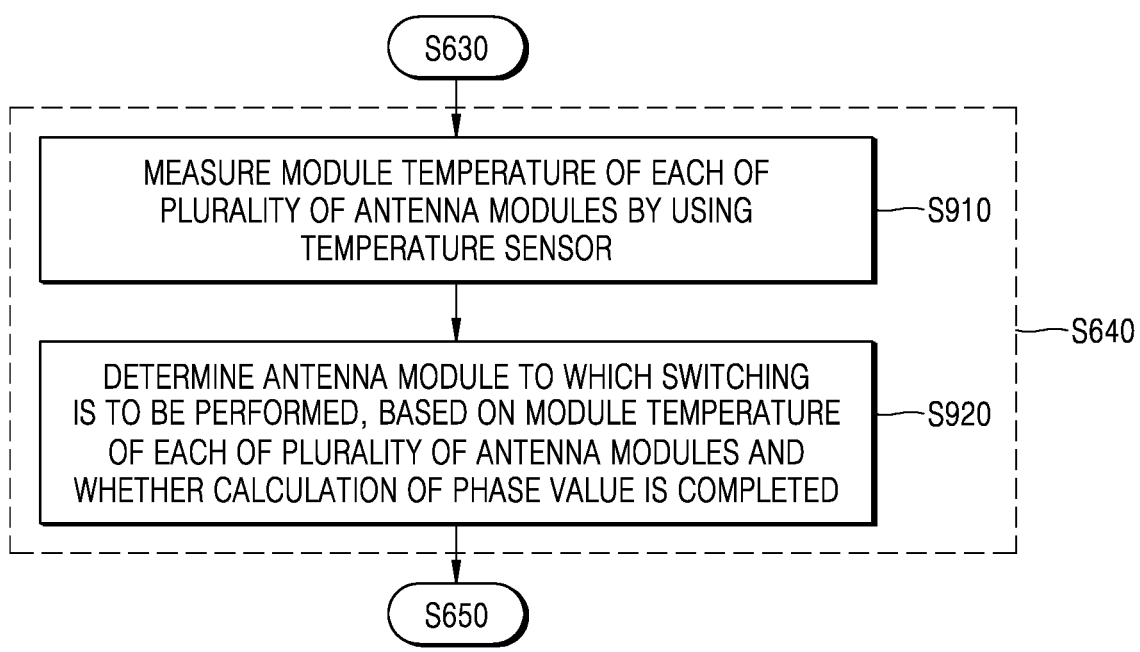
FIG. 9 is a flowchart illustrating an operating method of a millimeter wave communication device according to an embodiment of the disclosure.

FIG. 9 is a flowchart illustrating an operating method of a millimeter wave communication device according to an embodiment of the disclosure.

Operations S910 and S920 illustrated in FIG. 9 may be detailed operations of operation S640 illustrated in FIG. 6. Operation S910 illustrated in FIG. 9 may be performed after operation S630 illustrated in FIG. 6 is performed. Operation S650 illustrated in FIG. 6 may be performed after operation S920 illustrated in FIG. 9 is performed.

Referring to FIG. 9, in operation S910, the millimeter wave communication device 1000 may measure the module temperature of each of the plurality of antenna modules by using the temperature sensor. In an embodiment, the processor 1410 of the modem 1400 (see FIGS. 4A and 4B), which is a component of the millimeter wave communication device 1000, may measure the module temperature of each of the plurality of antenna modules by using the temperature sensor included in each of the plurality of antenna modules. The temperature sensor may include, for example, a thermistor. However, the disclosure is not limited thereto, and the temperature sensor may include a diode whose forward voltage varies according to temperature, a bipolar transistor, or the like. In an embodiment, the processor 1410 may periodically measure the module temperature of each of the plurality of antenna modules according to a preset time period.

In operation S920, the millimeter wave communication device 1000 may determine an antenna module to which switching is to be performed, based on the module temperature of each of the plurality of antenna modules and whether calculation of the phase value is completed. In an embodiment, the processor 1410 may determine an antenna module among the other antenna modules other than the antenna module in operation among the plurality of antenna modules, the measured module temperature of which is lowest and on which calculation of the phase value by using the beamforming simulation data stored in the simulation data storage 1440 is completed, as an antenna module to which switching is to be performed.

Figure 10:
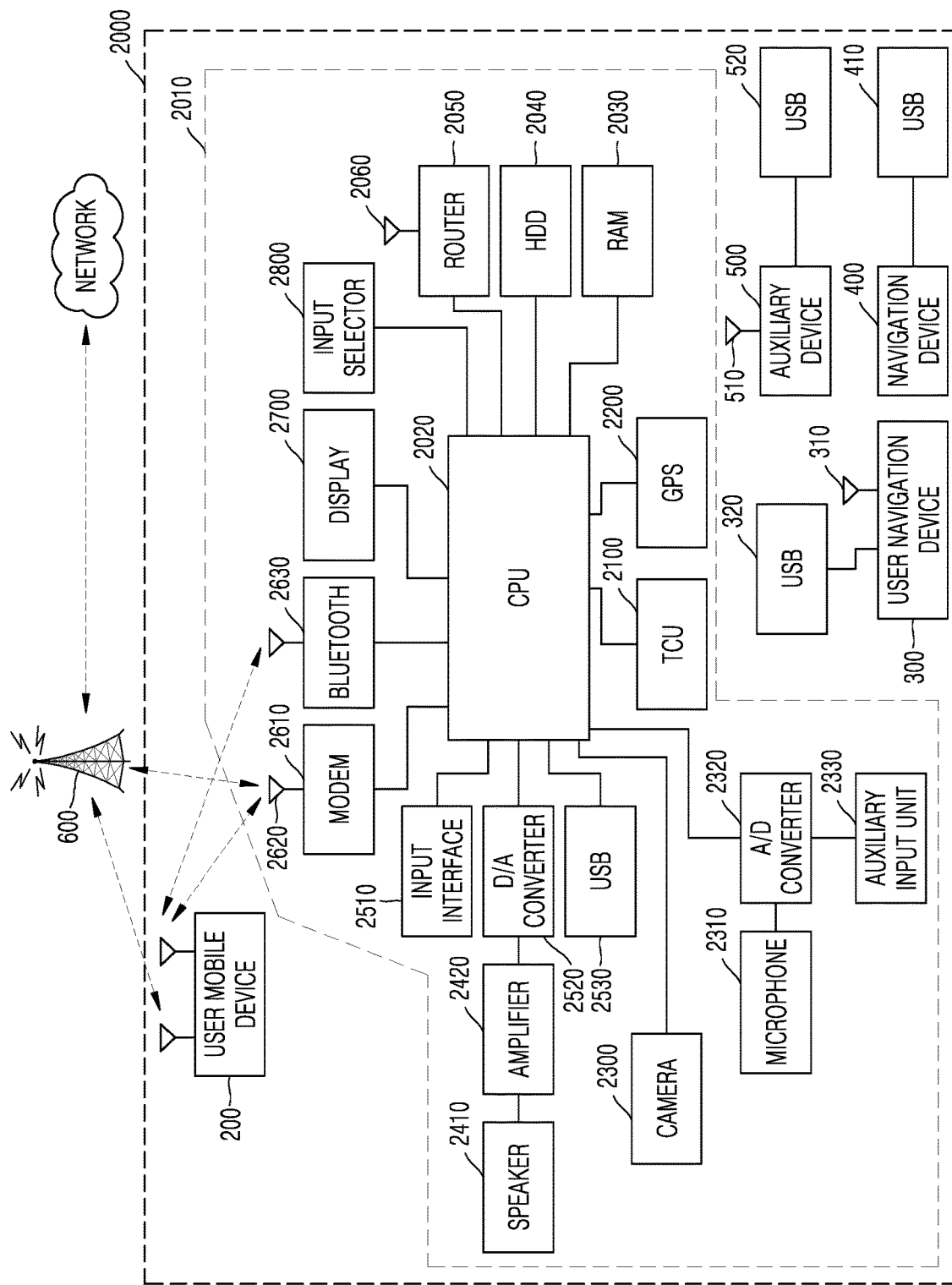
FIG. 10 is a block diagram illustrating components of a vehicle-based computing system according to an embodiment of the disclosure.

FIG. 10 is a block diagram illustrating components of a vehicle-based computing system according to an embodiment of the disclosure.

The vehicle-based computing system 2000 may refer to a set of electronic devices that controls driving of the vehicle 100 (see FIG. 2), transmits/receives data about the vehicle 100, or controls an operation of an auxiliary device of the vehicle 100 (e.g., opening/closing of a window or a door). An electronic device 2010 included in the vehicle-based computing system 2000 may be a device mounted on the vehicle 100, a device connected by wire or wireless to the device mounted on the vehicle 100, or a device located near the vehicle 100. The vehicle-based computing system 2000 illustrated in FIG. 10 may include the millimeter wave communication device 1000 illustrated in FIG. 4A and/or the millimeter wave communication device 1000' illustrated in FIG. 4B. In an embodiment, the electronic device 2010 may be the same as the millimeter wave communication device 1000 illustrated in FIG. 4A and/or the millimeter wave communication device 1000' illustrated in FIG. 4B.

The components illustrated in FIG. 10 may not be essential components of the vehicle-based computing system 2000, and the vehicle-based computing system 2000 may be implemented by fewer or more components than those illustrated in FIG. 10.

Referring to FIG. 10, the vehicle-based computing system 2000 according to an embodiment of the disclosure may include a TCU 2100. The TCU 2100 may be configured to support wireless mobile communication for the vehicle 100. The TCU 2100 may be electrically and/or physically connected to the millimeter wave communication device 1000 illustrated in FIG. 4A.

At least some of the operations and functions performed by the processor 1410 (see FIG. 4A) of FIG. 4A may be performed by a CPU 2020 of FIG. 10. However, the embodiment is not limited thereto, and the TCU 2100 may include a separate processor for controlling an operation of the TCU 2100. Also, each component included in the millimeter wave communication device 1000 (see FIG. 4A) of FIG. 4A may be included in the TCU 2100 of FIG. 10 or may be located outside the TCU 2100 and connected to the TCU 2100. For example, the memory 1420 (see FIG. 4A) illustrated in FIG. 4A may correspond to a RAM 2030 of FIG. 10, and the simulation data storage 1440 (see FIG. 4A) illustrated in FIG. 4A may correspond to a hard disk drive (HDD) 2040 illustrated in FIG. 10.

The vehicle-based computing system 2000 may include various modules for obtaining situation information inside or outside the vehicle. For example, the vehicle-based computing system 2000 may include a camera 2300, a microphone 2310, an input interface 2510, and/or the like. Also, the vehicle-based computing system 2000 may include a communication module for receiving information from the outside, various sensors (e.g., radar sensors, lidar sensors, and the like) for obtaining environment information outside the vehicle, and various sensors for obtaining situation information inside the vehicle.

The camera 2300 may be to input video signals and may process image frames of still images, moving images, or the like obtained by an image sensor. The image frame processed by the camera 2300 may be stored in a memory or may be transmitted through a communication module to the outside. Two or more cameras 2300 may be provided according to embodiments. For example, the camera 2300 may be implemented in various forms such as front cameras, rear cameras, left cameras, right cameras, internal cameras, and black box cameras. Also, the camera 2300 according to an embodiment of the disclosure may include an infrared camera.

The camera 2300 may obtain background information about objects, terrains, and roads located outside the vehicle. The camera 2300 may obtain an image around the vehicle 100, and the CPU 2020 may identify, from the obtained image, a building, a mountain, another vehicle, a pedestrian, a lane, a headlight, a street tree, or the like located within a preset distance from the vehicle 100.

The CPU 2020 according to the embodiment illustrated in FIG. 10 may control at least some of the operations and functions of the vehicle-based computing system 2000. The CPU 2020 may be connected to the RAM 2030 that is a non-permanent storage device and the HDD 2040 that is a permanent storage device. The HDD 2040 may be replaced with a flash memory.

The CPU 2020 may receive a user input for allowing a user to interact with the CPU 2020. For example, the vehicle-based computing system 2000 may include at least one of a microphone 2310, an auxiliary input unit 2330, an input interface 2510, a universal serial bus (USB) input unit 2530, a GPS 2200, and a Bluetooth transceiver 2630. Also, the vehicle-based computing system 2000 may include an input selector 2800 for selecting an input method to receive various inputs from the user. An analog input received from the microphone 2310 and the auxiliary input unit 2330 may be converted into a digital signal by an analog-to-digital (A/D) converter 2320 before being transmitted to the CPU 2020. Also, although not illustrated in FIG. 10, a plurality of vehicle components and auxiliary components may communicate with the vehicle-based computing system 2000 by using a vehicle network (which may include, for example, a controller area network (CAN) bus but is not limited thereto).

Also, the vehicle-based computing system 2000 may include a display 2700 and a speaker 2410 as an output unit. The speaker 2410 may be connected to an amplifier 2420 and may receive an audio output signal from the CPU 2020 through a digital-to-analog (D/A) converter 2520. Also, the output of the vehicle-based computing system 2000 may be output through an external device connected by USB or Bluetooth, such as a personal navigation device 300 or a vehicle navigation device 400 embedded in the vehicle 100.

The vehicle-based computing system 2000 may include a display 2700. The display 2700 may display information processed in the vehicle-based computing system 2000. When the display 2700 and a touch pad are configured as a touch screen by forming a layer structure with each other, the display 2700 may also be used as an input device in addition to an output device. For example, the display 2700 may include a transparent display or a heads-up display.

The vehicle-based computing system 2000 may receive data from at least one of another vehicle, a user mobile device 200, a base station 600, and a server.

According to an embodiment, the vehicle-based computing system 2000 may communicate with the user mobile device 200 (e.g., a cellular phone, a smart phone, a personal digital assistant (PDA), or other devices supporting wireless remote network access) by using the Bluetooth transceiver 2630. The user mobile device 200 may be, for example, a device possessed by a passenger riding in the vehicle 100. The user mobile device 200 may communicate with a network outside the vehicle through communication with the base station 600. For example, the base station 600 may be a base station supporting cellular communication or may be a WiFi access point.

Pairing of the user mobile device with the Bluetooth transceiver 2630 of the vehicle-based computing system 2000 may be instructed by a user input received through the input interface 2510 such as a button. Thus, the CPU 2020 may be instructed to pair the Bluetooth transceiver 2630 with the Bluetooth transceiver of the user mobile device 200.

The CPU 2020 may communicate with the network through the user mobile device 200 or may directly communicate with the network by using an embedded modem 2610 including an antenna 2620. For example, the modem 2610 may be a USB cellular modem supporting cellular communication.

The CPU 2020 according to an embodiment may provide an operating system including an application programming interface (API) for communicating with modem application software. The modem application software may access an embedded module or firmware on the Bluetooth transceiver 2630 to complete wireless communication with the Bluetooth transceiver mounted on an external device such as the user mobile device 200. Bluetooth is a technology included in the IEEE 802 Personal Area Network (PAN) protocol. The IEEE 802 Local Area Network (LAN) protocol may include WiFi and may have many cross functions with the IEEE 802 PAN protocol. In addition to Bluetooth or WiFi, free-space optical communication (e.g., Infrared Data Association (IrDA)) may be used for wireless communication in the vehicle 100.

According to another embodiment not illustrated in FIG. 10, the user mobile device 200 may be replaced with a cellular communication device installed in the electronic device 2010 mounted on the vehicle 100.

Input data input to the vehicle-based computing system 2000 may be transmitted to the internal CPU 2020 of the vehicle through the user mobile device 200 and the Bluetooth transceiver 2630. For example, the input data may be stored in the HDD 2040 or another storage medium until it is no longer needed.

As an additional source that may interact with the vehicle 100, the vehicle-based computing system 2000 may include, for example, a user navigation device 300 having USB connection 320 and/or antenna 310, a vehicle navigation device 400 having USB 410 or another connection, an on-board GPS 2200, or a remote navigation system (not illustrated) having connectivity to the network. USB may be one of a series of networking protocols. Most communication protocols used in the vehicle-based computing system 2000 may be used to perform telecommunication or optical communication.

Also, the CPU 2020 may communicate with various other auxiliary devices 500. The auxiliary device 500 may connect to the CPU 2020 through wireless (510) or wired (520) connection. The auxiliary device 500 may include, but is not limited to, a personal media player, a wireless health device, a portable computer, and/or the like.

Also, the CPU 2020 may be connected to the vehicle 100 based on, for example, a wireless router 2050 using a WiFi transceiver 2060. In this case, the CPU 2020 may connect to a remote network located in range of the local router (e.g., wireless router 2050).

According to an embodiment, at least some processes may be executed by a computing system communicating with the vehicle-based computing system 2000. The computing system may include a wireless device (e.g., a mobile phone) or a remote computing system (e.g., a server) connected through a wireless device. These computing systems may be collectively referred to as a vehicle associated computing system (VACS).

Figure 11:
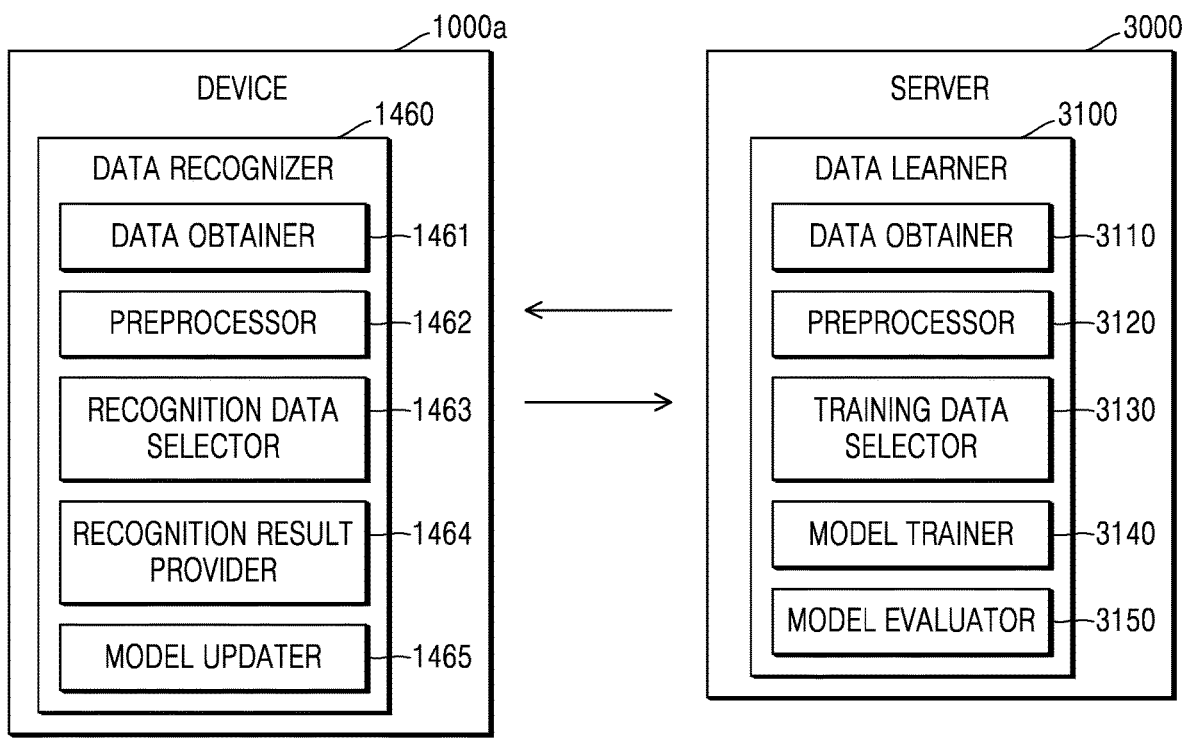
FIG. 11 is a diagram illustrating an example in which a device and a server learn and recognize data by interoperating with each other according to an embodiment of the disclosure.

FIG. 11 is a diagram illustrating an example in which a device and a server learn and recognize data by interoperating with each other according to an embodiment of the disclosure.

The device 1000a or the vehicle-based computing system 2000 according to an embodiment of the disclosure may support wireless mobile communication by using artificial intelligence by interoperating with the server. For example, the device 1000a or the vehicle-based computing system 2000 may use artificial intelligence to analyze surrounding environment information or perform antenna switching. The device 1000a of FIG. 11 may correspond to the millimeter wave communication device 1000 (see FIG. 4A) illustrated in FIG. 4A, the millimeter wave communication device 1000' illustrated in FIG. 4B, or the processor 1410 (see FIG. 4A) of the millimeter wave communication device 1000 or may correspond to the vehicle-based computing system 2000 (see FIG. 10) illustrated in FIG. 10 or the CPU 2020 (see FIG. 10) of the vehicle-based computing system 2000.

Referring to FIG. 11, the server 3000 may learn a criterion for situation determination and/or an antenna switching method, and the device 1000a may determine a situation based on the result of learning by the server 3000.

The data learner 3100 included in the server 3000 according to an embodiment of the disclosure may learn a criterion for situation determination and/or antenna switching method determination. The data learner 3100 may learn a criterion about what data to use to determine a certain situation or perform antenna switching and a criterion about how to perform determination by using the data. The data learner 3100 may learn a method for performing situation determination and/or antenna switching by obtaining data to be used for training and applying the obtained data to a data recognition model.

A data recognizer 1460 included in the device 1000a according to an embodiment of the disclosure may recognize a method for determining a situation based on data or performing antenna switching. The data recognizer 1460 may recognize a situation from certain data by using a trained data recognition model. The data recognizer 1460 may determine a certain situation based on certain data or determine an antenna switching method by obtaining certain data according to a preset criterion based on training and then using the data recognition model by using the obtained data as an input value. Also, a result value output by the data recognition model by using the obtained data as an input value may be used to update the data recognition model.

At least one of the data learner 3100 and the data recognizer 1460 may be manufactured in the form of at least one hardware chip and mounted on an electronic device. For example, at least one of the data learner 3100 and the data recognizer 1460 may be manufactured in the form of a dedicated hardware chip for artificial intelligence (AI) or may be manufactured as a portion of a general-purpose processor (e.g., a CPU or an application processor) or a graphic processor (e.g., a graphic processing unit (GPU)) and mounted on various electronic devices described above.

Also, the data learner 3100 and the data recognizer 1460 may provide model information constructed by the data learner 3100 to the data recognizer 1460 through wired or wireless communication, or data input to the data recognizer 1460 may be provided as additional training data to the data learner 3100.

Moreover, at least one of the data learner 3100 and the data recognizer 1460 may be implemented as a software module. When at least one of the data learner 3100 and the data recognizer 1460 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

The data learner 3100 according to an embodiment may include a data obtainer 3110, a preprocessor 3120, a training data selector 3130, a model trainer 3140, and a model evaluator 3150.

The data obtainer 3110 may obtain data necessary to perform situation determination and/or antenna switching.

For example, the data obtainer 3110 may receive beamforming simulation data about each of the plurality of antenna modules included in the millimeter wave communication device 1000 (see FIGS. 4A and 4B). Here, the beamforming simulation data may include phase value information obtained through pre-performed simulation to perform beamforming with respect to the base station by each of the plurality of antenna modules. As another example, the data obtainer 3110 may receive beamforming simulation data stored in an external memory, from the external memory.

The preprocessor 3120 may preprocess the obtained data such that the obtained data may be used for training for performing situation determination and/or antenna switching. The preprocessor 3120 may process the obtained data into a preset format such that the model trainer 3140 described below may use the obtained data for training.

The training data selector 3130 may select data necessary for training among the preprocessed data. The selected data may be provided to the model trainer 3140. The training data selector 3130 may select data necessary for training among the preprocessed data according to a preset criterion. Also, the training data selector 3130 may select data according to a preset criterion by training by the model trainer 3140 described below.

The model trainer 3140 may learn a criterion about how to determine a situation based on the training data or how to perform antenna switching. Also, the model trainer 3140 may learn a criterion about what training data should be used for situation determination and/or antenna switching.

As an example, by learning the driving information of vehicles, the model trainer 3140 may learn a criterion for selecting a method of performing antenna switching by selecting an optimal antenna module based on the position information of the vehicle, the information about the base station connected for V2X communication, the result of comparison of the input beamforming simulation data, or the surrounding environment information.

Also, by using the training data, the model trainer 3140 may train a data recognition model used to perform situation determination and/or antenna switching. In this case, the data recognition model may be a pre-constructed model. For example, the data recognition model may be a model pre-constructed by receiving basic training data (e.g., beamforming simulation data, optimal antenna switching information determined according to the position of the vehicle, and/or the like).

The data recognition model may be constructed by considering the application field of the recognition model, the purpose of training, or the computer performance of the device. The data recognition model may be, for example, a model based on a neural network. For example, a model such as a convolutional neural network (CNN), a deep neural network (DNN), a recurrent neural network (RNN), or a bidirectional recurrent deep neural network (BRDNN) may be used as the data recognition model; however, the disclosure is not limited thereto.

As an example, by using the pre-obtained beamforming simulation data and the driving information of the vehicle, the model trainer 3140 may train a data recognition model for performing antenna switching by selecting an optimal antenna module according to the position of the vehicle.

The model evaluator 3150 may input evaluation data into the data recognition model and may cause the model trainer 3140 to retrain when the recognition result output from the evaluation data does not satisfy a certain criterion. In this case, the evaluation data may be preset data for evaluating the data recognition model.

For example, the model evaluator 3150 may evaluate that the certain criterion is not satisfied, when the number or ratio of evaluation data with inaccurate recognition results among the recognition results of the trained data recognition model about the evaluation data exceeds a preset threshold value. For example, when the certain criterion is defined as a ratio of 2%, the model evaluator 3150 may evaluate that the trained data recognition model is not suitable, when the trained data recognition model outputs incorrect recognition results with respect to more than 20 evaluation data among a total of 1,000 evaluation data.

Moreover, at least one of the data obtainer 3110, the preprocessor 3120, the training data selector 3130, the model trainer 3140, and the model evaluator 3150 in the data learner 3100 may be manufactured in the form of at least one hardware chip and mounted on the electronic device. For example, at least one of the data obtainer 3110, the preprocessor 3120, the training data selector 3130, the model trainer 3140, and the model evaluator 3150 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

Also, at least one of the data obtainer 3110, the preprocessor 3120, the training data selector 3130, the model trainer 3140, and the model evaluator 3150 may be implemented as a software module. When at least one of the data obtainer 3110, the preprocessor 3120, the training data selector 3130, the model trainer 3140, and the model evaluator 3150 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Moreover, referring to FIG. 11, the data recognizer 1460 according to an embodiment may include a data obtainer 1461, a preprocessor 1462, a recognition data selector 1463, a recognition result provider 1464, and a model updater 1465.

The data obtainer 1461 may obtain data necessary to perform situation determination and/or antenna switching. The preprocessor 1462 may preprocess the obtained data such that the obtained data may be used for situation determination and/or antenna switching. The preprocessor 1462 may process the obtained data into a preset format such that the recognition result provider 1464 described below may use the obtained data.

The recognition data selector 1463 may select data necessary for situation determination and/or an antenna switching method among the preprocessed data. The selected data may be provided to the recognition result provider 1464. The recognition data selector 1463 may select some or all of the preprocessed data according to a preset criterion for performing situation determination and/or antenna switching. Also, the recognition data selector 1463 may select data according to a preset criterion by training by the model trainer 3140 described above.

The recognition result provider 1464 of the device 1000a may determine a situation or determine an antenna switching method by applying the data selected by the recognition data selector 1463 to the data recognition model generated by the server 3000. The recognition result provider 1464 may provide the recognition result according to the purpose of recognizing data. The recognition result provider 1464 may apply the selected data to the data recognition model by using the data selected by the recognition data selector 1463 as an input value. Also, the recognition result may be determined by the data recognition model.

In an embodiment, the recognition result provider 1464 may obtain an image of the surrounding environment of the vehicle and identify a base station supporting V2X communication with the vehicle from the obtained image.

As another example, the recognition result provider 1464 may select a method of performing antenna switching by selecting an optimal antenna module based on the surrounding environment information or by using the position information of the vehicle, the information about the base station connected for cellular communication, and/or the beamforming simulation data.

The model updater 1465 may allow the data recognition model to be updated based on the evaluation of the recognition result provided by the recognition result provider 1464. For example, the model updater 1465 may allow the model trainer 3140 to update the data recognition model, by providing the model trainer 3140 with the recognition result provided by the recognition result provider 1464.

Moreover, at least one of the data obtainer 1461, the preprocessor 1462, the recognition data selector 1463, the recognition result provider 1464, and the model updater 1465 in the data recognizer 1460 may be manufactured in the form of at least one hardware chip and mounted on the electronic device. For example, at least one of the data obtainer 1461, the preprocessor 1462, the recognition data selector 1463, the recognition result provider 1464, and the model updater 1465 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

Also, at least one of the data obtainer 1461, the preprocessor 1462, the recognition data selector 1463, the recognition result provider 1464, and the model updater 1465 may be implemented as a software module. When at least one of the data obtainer 1461, the preprocessor 1462, the recognition data selector 1463, the recognition result provider 1464, and the model updater 1465 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 12:
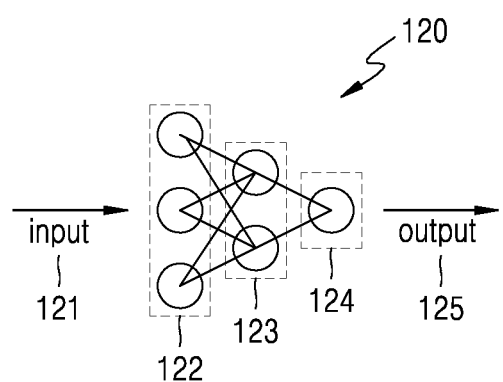
FIG. 12 is a diagram for describing an operation in which an operation or function of a millimeter wave communication device is performed by using artificial intelligence technology according to an embodiment of the disclosure.

FIG. 12 is a diagram for describing an operation performed by using artificial intelligence technology, in an embodiment of the disclosure.

Particularly, at least one of i) an operation of transmitting/receiving data on a millimeter wave communication channel formed with the base station through the first antenna module among the plurality of antenna modules arranged apart from each other, ii) an operation of calculating, by using the prestored beamforming simulation data, a phase value for performing beamforming based on a phase shift with respect to the base station by each of the plurality of antenna modules, iii) an operation of recognizing an operation state change of the first antenna module in operation, iv) an operation of performing antenna switching from the first antenna module to the second antenna module among the plurality of antenna modules according to the recognized operational state change for continuity of data communication with the base station, and v) an operation of performing, by using the calculated phase value, beamforming for forming a communication channel with the base station by the second antenna module, which are performed by the millimeter wave communication device 1000, may be performed by using an artificial Intelligence (AI) technology performing an operation through a neural network.

Artificial intelligence technology (hereinafter referred to as "AI technology") may be a technology for obtaining a desired result by processing (e.g., analyzing and/or classifying) input data based on operation through a neural network.

The AI technology may be implemented by using an algorithm. Here, an algorithm or a set of algorithms for implementing the AI technology may be referred to as a neural network. Here, the neural network may receive input data, perform an operation for analysis and/or classification, and output result data. In order for the neural network to accurately output the result data corresponding to the input data, it may be necessary to train the neural network. Here, "training" may represent training the neural network such that the neural network may personally find and learn a method of analyzing a plurality of pieces of input data to the neural network, a method of classifying the plurality of pieces of input data, and/or a method of extracting features necessary for generating result data from the plurality of pieces of input data. Particularly, through a training process, the neural network may optimize the weight values in the neural network by training input data (e.g., a plurality of different images). Then, a desired result may be output by processing the input data through the neural network having optimized weight values.

The neural network may be classified as a deep neural network when the neural network includes a plurality of hidden layers as internal layers for performing an operation, that is, when the depth of the neural network for performing an operation increases. Examples of the neural network may include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), and Deep Q-Networks. Also, the neural network may be subdivided. For example, the CNN neural network may be subdivided into Deep Convolution Neural Networks (DCNNs) or CapsNet neural networks (not illustrated).

"AI model" may refer to a neural network including at least one layer that receives input data and operates to output a desired result. Also, "AI model" may refer to an algorithm for outputting a desired result by performing an operation through a neural network, a set of algorithms, a processor for executing an algorithm (or a set of algorithms), software for executing an algorithm (or a set of algorithms), or hardware for executing an algorithm (or a set of algorithms).

At least one of i) the operation of transmitting/receiving data on a millimeter wave communication channel formed with the base station through the first antenna module among the plurality of antenna modules arranged apart from each other, ii) the operation of calculating, by using the prestored beamforming simulation data, a phase value for performing beamforming based on a phase shift with respect to the base station by each of the plurality of antenna modules, iii) the operation of recognizing an operation state change of the first antenna module in operation, iv) the operation of performing antenna switching from the first antenna module to the second antenna module among the plurality of antenna modules according to the recognized operational state change for continuity of data communication with the base station, and v) the operation of performing, by using the calculated phase value, beamforming for forming a communication channel with the base station by the second antenna module, which have been described above, may be performed based on the AI model.

Referring to FIG. 12, a neural network 120 may be trained by receiving training data. Also, the trained neural network 120 may receive input data 121 through an input terminal 122, and the input terminal 122, a hidden layer 123, and an output terminal 124 may perform an operation for outputting output data 125 by analyzing the input data 121 and data transmitted from the previous layer. FIG. 12 illustrates that the hidden layer 123 includes one layer; however, this is merely an example and the hidden layer 123 may include a plurality of layers.

In the described embodiment, the neural network 120 may be trained to recognize at least one of the changes in the position and direction of the first antenna module due to the increase in the module temperature of the first antenna module in operation and the movement of the vehicle.

In the described embodiment, the neural network 120 may be trained to detect the first time point at which the module temperature of the first antenna module measured by using the temperature sensor exceeds the preset threshold temperature and switch the first antenna module in operation to the second antenna module at the first time point.

In the described embodiment, the neural network 120 may be trained to detect the second time point at which the module temperature of the first antenna module measured by using the temperature sensor reaches the preset threshold range lower than the preset threshold temperature and identify whether calculation of the phase value for performing beamforming with respect to the base station by each of the plurality of antenna modules is completed at the second time point.

In the described embodiment, the neural network 120 may be trained to determine the antenna module to which switching is to be performed, as the second antenna module based on the module temperature of each of the plurality of antenna modules and whether calculation of the phase value is completed.

In the described embodiment, data or program code related to the neural network 120 performing at least one of i) the operation of transmitting/receiving data on a millimeter wave communication channel formed with the base station through the first antenna module among the plurality of antenna modules arranged apart from each other, ii) the operation of calculating, by using the prestored beamforming simulation data, a phase value for performing beamforming based on a phase shift with respect to the base station by each of the plurality of antenna modules, iii) the operation of recognizing an operation state change of the first antenna module in operation, iv) the operation of performing antenna switching from the first antenna module to the second antenna module among the plurality of antenna modules according to the recognized operational state change for continuity of data communication with the base station, and v) the operation of performing, by using the calculated phase value, beamforming for forming a communication channel with the base station by the second antenna module, which have been described above, may be stored in the memory 1420 (see FIG. 4A), and training using the neural network 120 may be performed by the processor 1410 (see FIG. 4A).

Alternatively, the neural network 120 performing at least one of i) the operation of transmitting/receiving data on a millimeter wave communication channel formed with the base station through the first antenna module among the plurality of antenna modules arranged apart from each other, ii) the operation of calculating, by using the prestored beamforming simulation data, a phase value for performing beamforming based on a phase shift with respect to the base station by each of the plurality of antenna modules, iii) the operation of recognizing an operation state change of the first antenna module in operation, iv) the operation of performing antenna switching from the first antenna module to the second antenna module among the plurality of antenna modules according to the recognized operational state change for continuity of data communication with the base station, and v) the operation of performing, by using the calculated phase value, beamforming for forming a communication channel with the base station by the second antenna module, which have been described above, may be implemented in a separate device (not illustrated) or a processor (not illustrated) distinguished from the millimeter wave communication device 1000.

The above operation through the neural network 120 may be performed by the server 3000 (see FIGS. 13 and 14) capable of communicating with the millimeter wave communication device 1000 according to an embodiment through a wireless communication network. The communication between the millimeter wave communication device 1000 and the server 3000 will be described with reference to FIGS. 13 and 14.

Figure 13:
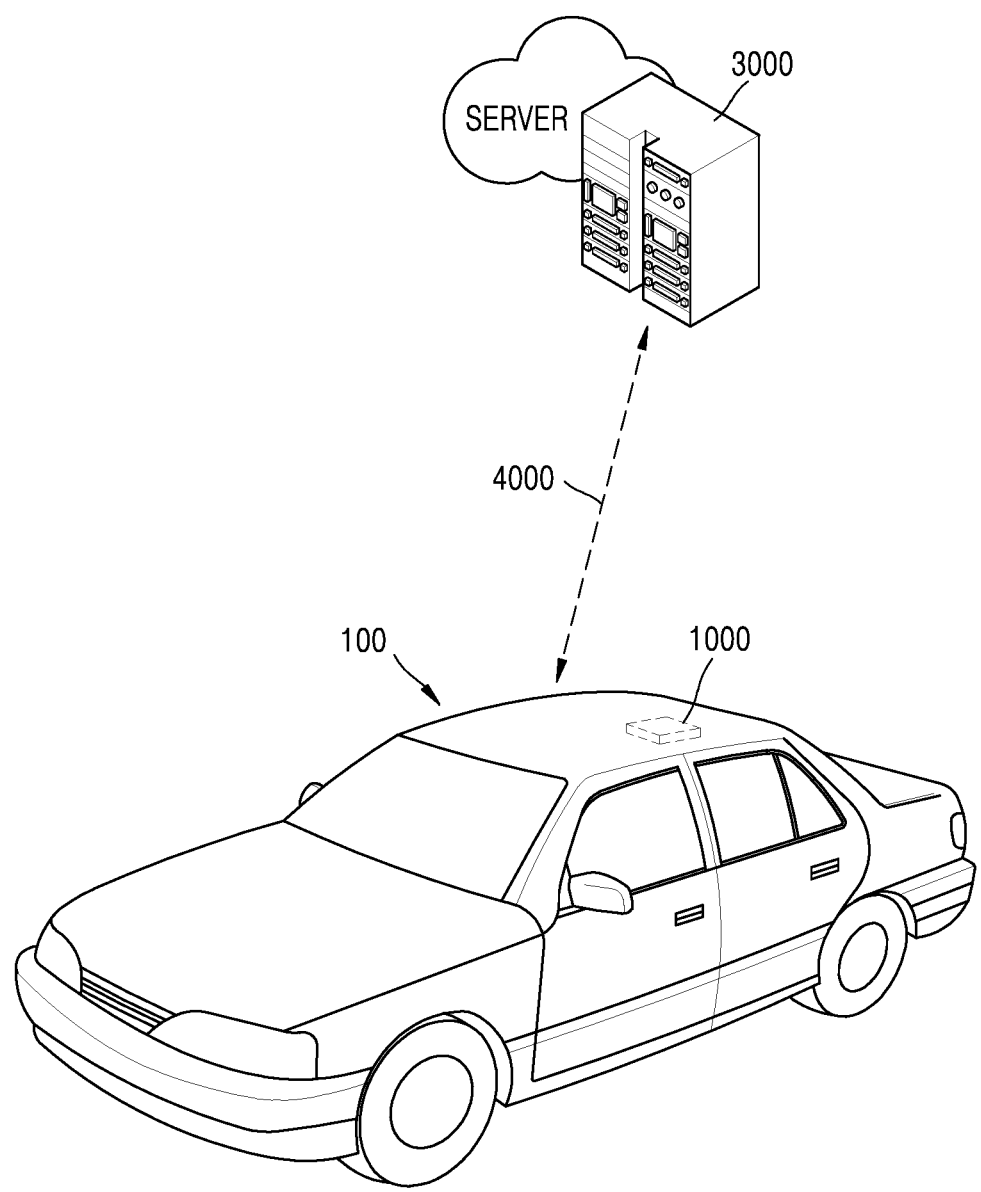
FIG. 13 is a diagram illustrating an embodiment in which a millimeter wave communication device operates in conjunction with a server according to an embodiment of the disclosure.

FIG. 13 is a diagram illustrating a millimeter wave communication device 1000 operating in conjunction with a server, according to an embodiment of the disclosure.

The server 3000 may transmit/receive data to/from the millimeter wave communication device 1000 through a communication network and process the data.

Referring to FIG. 13, the server 3000 may include a communicator 3500 communicating with the millimeter wave communication device 1000, a processor 3200 performing at least one instruction, a database (DB) 3300, and a data learning model 3400.

The server 3000 may train an AI model and store the trained AI model. Also, by using the trained AI model, the server 3000 may perform at least one of i) the operation of transmitting/receiving data on a millimeter wave communication channel formed with the base station through the first antenna module among the plurality of antenna modules arranged apart from each other, ii) the operation of calculating, by using the prestored beamforming simulation data, a phase value for performing beamforming based on a phase shift with respect to the base station by each of the plurality of antenna modules, iii) the operation of recognizing an operation state change of the first antenna module in operation, iv) the operation of performing antenna switching from the first antenna module to the second antenna module among the plurality of antenna modules according to the recognized operational state change for continuity of data communication with the base station, and v) the operation of performing, by using the calculated phase value, beamforming for forming a communication channel with the base station by the second antenna module, which have been described above.

In general, in terms of the memory storage capacity, the operation processing speed, the training data set collection capability, and/or the like, the millimeter wave communication device 1000 may be restricted compared to the server 3000. Thus, after the server 3000 performs an operation requiring storage of a large amount of data and a large amount of computation, necessary data and/or the AI model may be transmitted to the millimeter wave communication device 1000 through a communication network. Then, the millimeter wave communication device 1000 may rapidly and easily perform a necessary operation without a processor having a large-capacity memory and a fast operation capability by receiving and using the necessary data and/or the AI model through the server 3000.

In the described embodiment, the server 3000 may include the neural network 120 described with reference to FIG. 12.

FIG. 14 is a diagram for describing FIG. 13 in detail according to an embodiment of the disclosure.

Referring to FIG. 14, the server 3000 may include a communicator 3500, a processor 3200, a database 3300, and a data learning model 3400. In FIG. 13, the data learning model 3400 is illustrated as an independent component separate from the processor 3200 and the database 3300; however, the disclosure is not limited thereto. In an embodiment, the data learning model 3400 may be configured as a software module including at least one instruction or program code, and in this case, the data learning model 3400 may be included in the database 3300.

The communicator 3500 may communicate with an external device (e.g., a server) through a wireless communication network 4000. Here, the external device (not illustrated) may include a server (e.g., 3000) that may perform at least one of the operations required by the millimeter wave communication device 1000 or may transmit data required by the millimeter wave communication device 1000.

The communicator 3500 may include at least one communication module such as a short-range communication module, a wired communication module, a mobile communication module, and/or a broadcast receiving module. Here, the at least one communication module may include a tuner performing broadcast reception and/or a communication module capable of performing data transmission/reception through a network conforming to a communication standard such as a communication method using Bluetooth, Wireless LAN (WLAN), WiFi, Wireless Broadband (WiBro), World Interoperability for Microwave Access (WiMax), CDMA, WCDMA, Internet, 3G, 4G, 5G, and/or millimeter wave (mmWave).

For example, the communicator 3500 may rapidly transmit/receive a large amount of data by performing communication by using millimeter wave (mmWave). Particularly, the vehicle 100 may increase the safety of the vehicle 100 and/or the user's convenience by rapidly receiving a large amount of data by using millimeter waves and rapidly providing user content (e.g., movie or music) and/or data necessary for the safety of the vehicle 100 (e.g., data necessary for autonomous driving and/or data necessary for a navigation service).

The mobile communication module included in the communicator 3500 may communicate with another device (e.g., the server 3000) located at a long distance through a communication network conforming to a communication standard such as 3G, 4G, and/or 5G. Here, the communication module performing communication with another device located at a long distance may be referred to as a "long-range communication module."

The processor 3200 may control an overall operation of the server 3000. For example, the processor 3200 may perform desired operations by executing at least one instruction of the server 3000 and at least one of programs.

The database 3300 may include a memory (not illustrated) and store at least one of at least one instruction, programs, and data necessary for the server 3000 to perform a certain operation in the memory (not illustrated). Also, the database 3300 may store data necessary for the server 3000 to perform an operation according to the neural network.

In the described embodiment, the server 3000 may store the neural network 120 described with reference to FIG. 12. The neural network 120 may be stored in at least one of the processor 3200 and the database 3300. The neural network 120 included in the server 3000 may be a neural network that has been trained.

Also, the server 3000 may transmit the trained neural network to the modem 1400 (see FIG. 4A) of the millimeter wave communication device 1000 through the communicator 3500. Then, the millimeter wave communication device 1000 may obtain and store the trained neural network and may obtain desired output data through the neural network.

The program executed by the millimeter wave communication device 1000 described herein may be implemented as a hardware component, a software component, and/or a combination of a hardware component and a software component. The program may be performed by any system capable of executing computer-readable instructions.

The software may include computer programs, code, instructions, or a combination of one or more thereof and may configure the processor to operate as desired or may instruct the processor independently or collectively.

The software may be implemented as a computer program including instructions stored in a computer-readable storage medium. The computer-readable recording medium may include, for example, a magnetic storage medium (e.g., read-only memory (ROM), random-access memory (RAM), floppy disk, or hard disk) and an optical readable medium (e.g., compact disc read only memory (CD-ROM) or digital versatile disc (DVD)). The computer-readable recording medium may be distributed in network-connected computer systems such that computer-readable codes may be stored and executed in a distributed manner. The medium may be readable by a computer, stored in a memory, and executed in a processor.

The computer-readable storage mediums may be provided in the form of non-transitory storage mediums. Here, 'non-transitory' may merely mean that the storage mediums do not include signals and are tangible, but does not distinguish semi-permanent or temporary storage of data in the storage mediums. For example, the "non-transitory storage medium" may include a buffer in which data is temporarily stored.

Also, the program according to the embodiments described herein may be included and provided in a computer program product. The computer program product may be traded as a product between a seller and a buyer.

The computer program product may include a software program and a computer-readable storage medium with a software program stored therein. For example, the computer program product may include a product (e.g., a downloadable application) in the form of a software program electronically distributed through a manufacturer of the device or an electronic market (e.g., Google Play Store™ or App Store™). For electronic distribution, at least a portion of the software program may be stored in a storage medium or may be temporarily generated. In this case, the storage medium may be a storage medium of a server of the manufacturer of the millimeter wave communication device 1000, a server of the electronic market, or a relay server for temporarily storing the software program.

In a system including the millimeter wave communication device 1000, a server, and another device, the computer program product may include a storage medium of the server or a storage medium of the device. Alternatively, when there is a third device (e.g., a smart phone) communicatively connected to the millimeter wave communication device 1000, the computer program product may include a storage medium of the third device. Alternatively, the computer program product may include the software program itself transmitted from the millimeter wave communication device 1000 to the device or the third device or transmitted from the third device to the device.

In this case, one of the millimeter wave communication device 1000 and the third device may execute the computer program product to perform the method according to the described embodiments. Alternatively, two or more of the millimeter wave communication device 1000 and the third device may execute the computer program product to perform the method according to the described embodiments in a distributed manner.

For example, the millimeter wave communication device 1000 may execute the computer program product stored in the memory 1420 (see FIGS. 4A and 4B), to control another device communicatively connected to the millimeter wave communication device 1000, to perform the method according to the described embodiments.

As another example, the third device may execute the computer program product to control the device communicatively connected to the third device, to perform the method according to the described embodiments.

When the third device executes the computer program product, the third device may download the computer program product from the millimeter wave communication device 1000 and execute the downloaded computer program product. Alternatively, the third device may perform the method according to the described embodiments by executing the computer program product provided in a preloaded state.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A millimeter wave communication device mounted on a vehicle, the millimeter wave communication device comprising:
    a plurality of antenna modules configured to transmit or receive data on a millimeter wave communication channel formed with a base station;
    a switching circuit connected to each of the plurality of antenna modules and configured to perform antenna switching by selecting any one of the plurality of antenna modules; and
    a modem connected to the plurality of antenna modules and the switching circuit, and configured to control operations of the plurality of antenna modules and the switching circuit,
    wherein the modem comprises:
        a memory storing a program including one or more instructions,
        a processor configured to execute the one or more instructions of the program stored in the memory, and
        a storage storing, for continuity of data communication with the base station, beamforming simulation data including information about beam directionality obtained through pre-performed simulation according to positions at which the plurality of antenna modules are arranged,
    wherein each of the plurality of antenna modules comprises a temperature sensor configured to measure a module temperature, and
    wherein the processor is further configured to:
        calculate, by using the beamforming simulation data stored in the storage, a phase value for performing beamforming with respect to the base station by each of the plurality of antenna modules,
        recognize an operation state change of a first antenna module among the plurality of antenna modules,
        measure a module temperature of each of the plurality of antenna modules by using the temperature sensor,
        determine a second antenna module on which switching is to be performed, based on the operation state of the first antenna module, the measured module temperature of each of the plurality of antenna modules, and whether calculation of the phase value by using the beamforming simulation data stored in the storage is completed, control, according to the recognized operation state, the measured module temperature, and a determination of whether the calculation of the phase value is completed, the switching circuit to perform antenna switching from the first antenna module in operation to the second antenna module among the plurality of antenna modules, and control, by using the calculated phase value, the second antenna module to perform beamforming for forming a communication channel with the base station.

2. The millimeter wave communication device of claim 1, wherein the beamforming simulation data includes a phase correction value pre-obtained through simulation to correct a phase value for beamforming based on a position and angle at which each of the plurality of antenna modules is arranged and a direction of a beam directed to the base station when antenna switching is performed.

3. The millimeter wave communication device of claim 1, further comprising a codebook storage including a code word indicating a phase shift matrix having a phase value for performing beamforming with respect to the base station by each of the plurality of antenna modules as a variable, wherein the beamforming simulation data is obtained by pre-calculation based on the phase shift matrix indicated by the code word included in the codebook storage.

4. The millimeter wave communication device of claim 1, wherein the processor is further configured to measure a module temperature of the first antenna module in operation according to a preset time period by using the temperature sensor.

5. The millimeter wave communication device of claim 4, wherein the processor is further configured to:

detect a first time point at which the measured module temperature of the first antenna module exceeds a preset threshold temperature; and control the switching circuit to switch from the first antenna module in operation to the second antenna module at the first time point.

6. The millimeter wave communication device of claim 4, wherein the processor is further configured to:

detect a second time point at which the measured module temperature of the first antenna module reaches a preset threshold range lower than a preset threshold temperature; and identify whether calculation of the phase value for performing beamforming with respect to the base station by each of the plurality of antenna modules is completed at the second time point.

7. The millimeter wave communication device of claim 1, further comprising a transceiver configured to perform communication, via a controller area network (CAN), with a telematics control unit (TCU) of the vehicle.

8. The millimeter wave communication device of claim 7, wherein the transceiver is further configured to transmit data to the TCU for autonomous driving of the vehicle, high-resolution map data, or a vehicle operating system update.

9. The millimeter wave communication device of claim 7, further comprising an intermediate frequency integrated circuit (IFIC) configured to convert a baseband frequency band into an intermediate frequency, wherein the intermediate frequency is a frequency between the baseband frequency band and a frequency band used by the plurality of antenna modules.

10. A method, performed by a millimeter wave communication device mounted on a vehicle, of performing antenna switching, the method comprising:

transmitting or receiving data on a millimeter wave communication channel formed with a base station through a first antenna module among a plurality of antenna modules arranged apart from each other;

calculating, by using beamforming simulation data pre-stored in the millimeter wave communication device, a phase value for performing beamforming based on a phase shift with respect to the base station by each of the plurality of antenna modules;

recognizing an operation state change of the first antenna module in operation;

measuring a module temperature of each of the plurality of antenna modules by using a temperature sensor included in each of the plurality of antenna modules;

performing antenna switching from the first antenna module to a second antenna module among the plurality of antenna modules according to the recognized operation state change for continuity of data communication with the base station; and performing, by using the calculated phase value, beamforming for forming a communication channel with the base station by the second antenna module, wherein the performing of the antenna switching comprises:

determining the second antenna module on which switching is to be performed, based on the recognized operation state, the measured module temperature of each of the plurality of antenna modules and whether calculation of the phase value by using the beamforming simulation data stored in storage is completed; and performing switching from the first antenna module in operation to the determined second antenna module.

11. The method of claim 10, wherein the beamforming simulation data includes a phase correction value pre-obtained through simulation to correct a phase value for beamforming based on a position and angle at which each of the plurality of antenna modules is arranged and a direction of a beam directed to the base station when antenna switching is performed for continuity of data communication with the base station.

12. The method of claim 10, wherein the beamforming simulation data is obtained by pre-calculation based on a phase shift matrix indicated by a code word included in a codebook prestored in the millimeter wave communication device, and wherein the phase shift matrix includes a phase value for performing beamforming with respect to the base station as a variable.

13. The method of claim 10, wherein the recognizing of the operation state change of the first antenna module comprises measuring a module temperature of the first antenna module according to a preset time period by using a temperature sensor.

14. The method of claim 13, wherein the recognizing of the operation state change of the first antenna module comprises detecting a first time point at which the measured module temperature of the first antenna module exceeds a preset threshold temperature, and wherein the performing of the antenna switching comprises switching from the first antenna module in operation to the second antenna module at the first time point.

15. The method of claim 14, further comprising:
detecting a second time point at which the measured module temperature of the first antenna module reaches a preset threshold range lower than a preset threshold temperature; and
identifying whether calculation of the phase value for performing beamforming with respect to the base station by each of the plurality of antenna modules is completed at the second time point.

16. A computer program product comprising:
a computer-readable storage medium,
wherein the computer-readable storage medium comprises instructions executed by a millimeter wave communication device mounted on a vehicle to:
transmit or receive data on a millimeter wave communication channel formed with a base station through a first antenna module among a plurality of antenna modules arranged apart from each other,
calculate, by using beamforming simulation data pre-stored in the millimeter wave communication device, a phase value for performing beamforming based on a phase shift with respect to the base station by each of the plurality of antenna modules,
recognize an operation state change of the first antenna module in operation,
measure, by using a temperature sensor included in each of the plurality of antenna modules, a module temperature of each of the plurality of antenna modules,
determine a second antenna module on which switching is to be performed, based on the operation state of the first antenna module, the measured module temperature of each of the plurality of antenna modules, and whether calculation of the phase value by using the beamforming simulation data stored in the storage is completed,
perform antenna switching from the first antenna module in operation to the second antenna module among the plurality of antenna modules according to the recognized operation state, the measured module temperature, and a determination of whether the calculation of the phase value is completed for continuity of data communication with the base station, and
perform, by using the calculated phase value, beamforming for forming a communication channel with the base station by the second antenna module.

\* \* \* \* \*